United States Patent [19]
Marcato

[11] Patent Number: 5,114,268
[45] Date of Patent: May 19, 1992

[54] APPARATUS FOR APPLYING A TRAFFIC STRIPE TO A ROAD

[75] Inventor: Forrest Marcato, Montgomery, Ala.

[73] Assignee: MAC Stripers, Inc., Montgomery, Ala.

[21] Appl. No.: 642,968

[22] Filed: Jan. 18, 1991

[51] Int. Cl.$^5$ .................. E01C 23/16; E01C 23/00
[52] U.S. Cl. ............................ 404/92; 404/101
[58] Field of Search .......................... 404/92-94, 404/101

[56] References Cited

U.S. PATENT DOCUMENTS

| | | | |
|---|---|---|---|
| 2,026,870 | 1/1936 | Dalton | 91/18 |
| 2,875,675 | 3/1959 | Searight | 404/94 |
| 3,007,838 | 11/1961 | Eigenmann | 156/526 |
| 3,040,594 | 6/1962 | Bagshaw | 74/ |
| 3,046,854 | 7/1962 | Wilson | 404/94 |
| 3,092,325 | 6/1963 | Brown, Jr. et al. | 237/12.3 |
| 3,235,436 | 2/1966 | Eigenmann | 156/523 |
| 3,356,261 | 12/1967 | Stein | 222/63 |
| 3,477,352 | 11/1969 | Harding et al. | 94/44 |
| 3,679,626 | 7/1972 | Tanekusa et al. | 404/94 X |
| 3,820,718 | 6/1974 | Ammon | 239/135 |
| 3,886,011 | 5/1975 | Eigenmann | 156/71 |
| 3,964,559 | 6/1976 | Eigenmann | 180/1 |
| 3,964,835 | 6/1976 | Eigenmann | 404/94 |
| 4,082,587 | 4/1978 | Eigenmann | 156/71 |
| 4,190,205 | 2/1980 | Mitchell | 239/129 |
| 4,242,173 | 12/1980 | Stenemann | 156/523 |
| 4,313,780 | 2/1982 | Ford, Jr. | 156/523 |
| 4,373,670 | 2/1983 | Kilner | 404/94 X |
| 4,387,851 | 6/1983 | Dick | 239/135 |
| 4,576,122 | 3/1986 | Marcato | 122/26 |
| 4,623,279 | 11/1986 | Smith | 404/93 |
| 4,861,190 | 8/1989 | Glassel | 404/93 |

FOREIGN PATENT DOCUMENTS 0302037 2/1989 United Kingdom .................. 404/93

OTHER PUBLICATIONS

Specification Outline for Mini Mac 1000, dated Mr. 25, 1983.
Sketches of Guns for Mini Mac 1000.
Sepcification Outline for Thermo Mac 2000.
Specification Sheet for Thermo Mac 900 and Thermo Mac 1500.
Brochure for Pave-Mark Apollo II Series of thermoplastic applicators.
Brochure of Pave-Mark Zeus Handliner.
Brochure of Pave-Mark Javelin Thermoplastic Pushbox Applicator.
Advertisement for Add-A-Line Marking Equipment.
Brochure for Traffic Marking Technologies TMT 200 Self-Propelled Thermplastic Applicator.
Brochure for Traffic Marking Technologies Thermoplastic Application Equipment.
Mini Mac 1000 and 150 Brochure, Marcato Enterprises Incorporated.
Glenn's New Auto Repair Manual, pp. 787-794 (1965).
Thermo Mac 2000, and 1500, Mac Stripers, Inc. published in Jan. 1991.

Primary Examiner—Ramon S. Britts
Assistant Examiner—Nancy Connolly
Attorney, Agent, or Firm—Banner, Birch, McKie & Beckett

[57] ABSTRACT

An apparatus for applying a traffic stripe includes a vehicle having a pair of front wheels and a pair of rear wheels and members, disposed on the vehicle, for steering the front wheels. Also included is a traffic stripe applying system, disposed outward of the front wheels and adjacent to one of the front wheels, for applying a traffic stripe to a road. A connector pivotally connects this applying system to the vehicle and defines an axis about which the applying system pivots relative to the vehicle. In addition, connected to the applying system, disposed forward of the pivot axis and acting in response to the steering of the front wheels, is a member or members for turning the applying system in the same direction as the front wheels when the front wheels are turned. In a preferred embodiment, this turning member or members also turns the traffic strip applying system at a greater angle than the front wheels when the front wheels are turned in a direction towards the applying system.

59 Claims, 14 Drawing Sheets

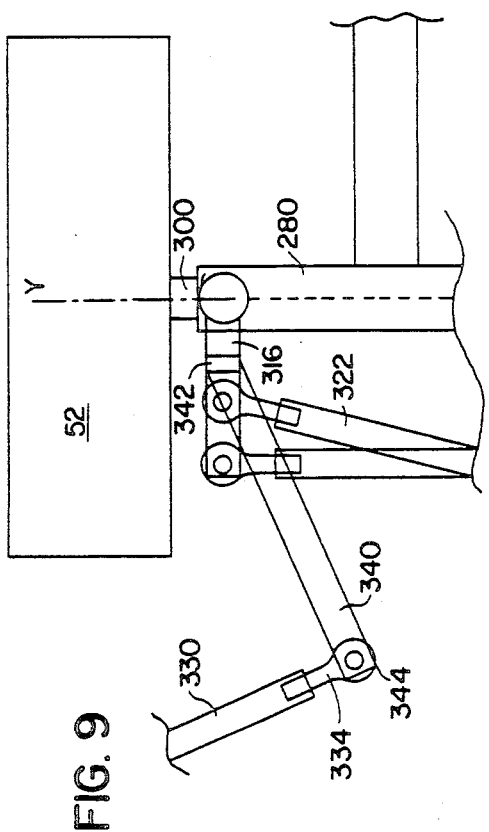
FIG. 9
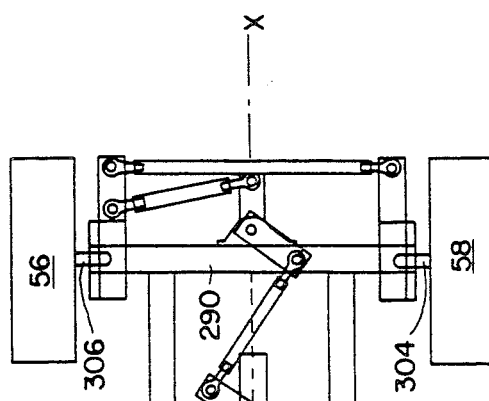
FIG. 8
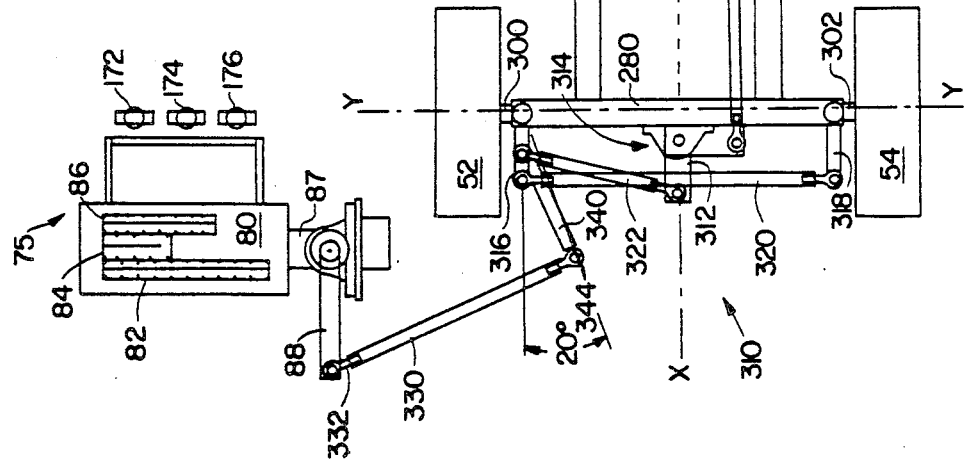

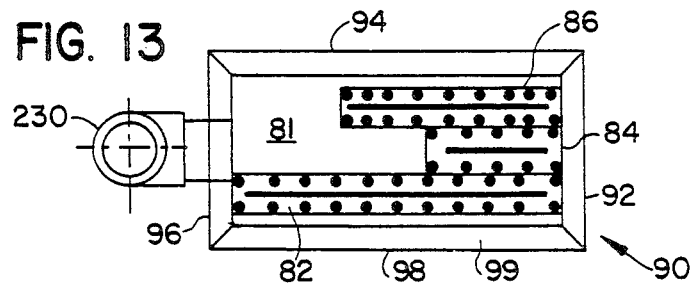
FIG. 13
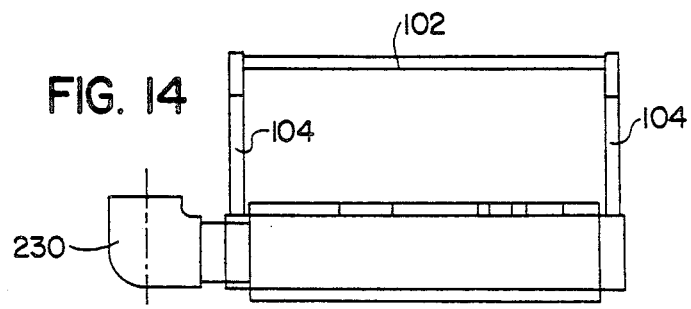
FIG. 14
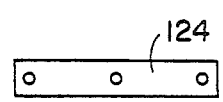
FIG. 15
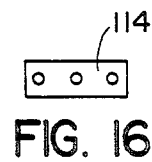
FIG. 16
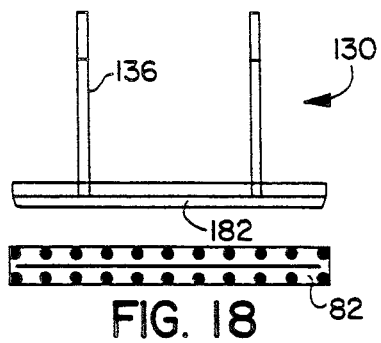
FIG. 17
FIG. 18
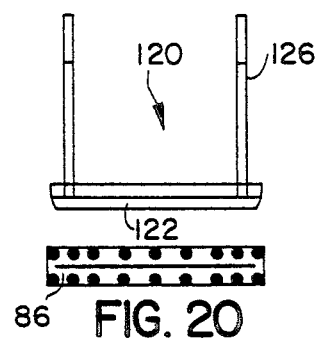
FIG. 19
FIG. 20
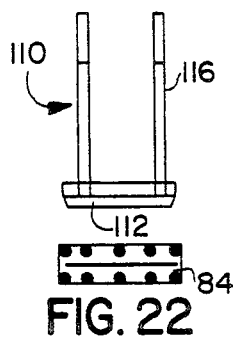
FIG. 21
FIG. 22
FIG. 23

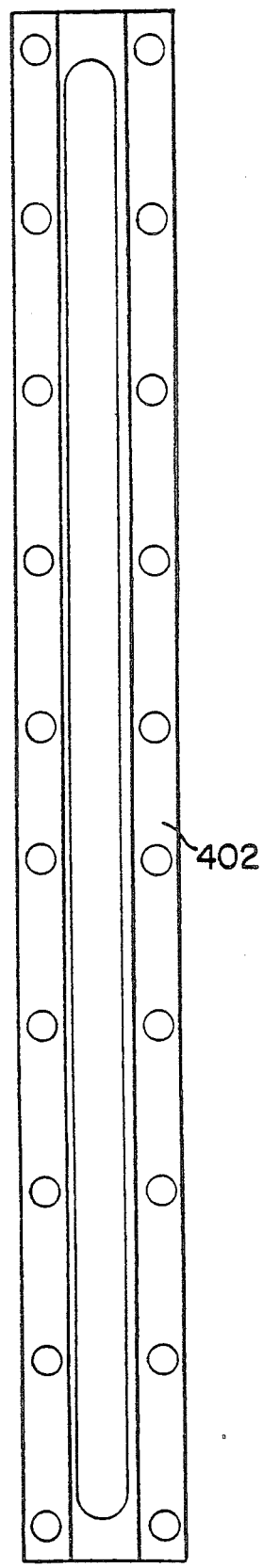
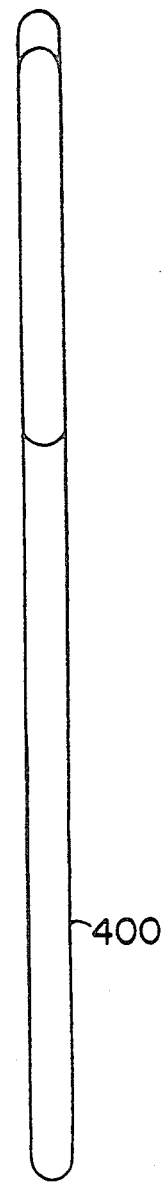
FIG. 31
FIG. 30
FIG. 29

APPARATUS FOR APPLYING A TRAFFIC STRIPE TO A ROAD

BACKGROUND OF THE INVENTION

The present invention relates to an apparatus for applying a traffic stripe to a road. Specifically, the invention relates to improvements in the steering, versatility, line precision and material application in such an apparatus.

In applying a traffic stripe to a road, one normally uses either hot or cold traffic paint, cold tape or more durable materials such as epoxy or thermoplastic. The term road generally means routes, passes, or parking lots for motor vehicles, bikes or the like which are usually comprised of asphalt or portland concrete. Also, it is preferable, but not necessary, to add reflective material on top of the traffic stripe in order to make the traffic stripe reflective at night.

Traffic stripes generally come in two forms. There are long line stripes and transverse stripes. Long line stripes are typically lines dividing lanes of a road or a path. Normally one applies one interrupt white line or two solid yellow lines. An interrupted line is a series of predetermined length traffic stripes separated by a series of predetermined length gaps.

These interrupted lines and the solid lines are normally four inches wide. When two lines are applied, they are normally also separated by four inches. These dimensions do change, however, according to different country, state, county and city regulations.

In certain long line applications, one may also have a solid four inch line and an adjacent interrupted four inch line. These generally four inch lines are separated by a four inch spacing. They are normally used in situations were a plurality of center turn lanes (i.e., left hand turn lanes in the United States) are used in, for example, a three lane road.

Transverse lines are normally shorter markings or legends. Transverse lines are normally considered to be stop bars, crosswalks, railroad crossing markings, words such as "ONLY", arrows, symbols and other markings and legends of that nature. Since cars often come to stops on transverse markings, transverse lines are sometimes directly subject to the power applied to back wheels during acceleration of a motor vehicle. Thus, transverse lines generally undergo more wear than long line stripes. Consequently, transverse lines are normally thicker then long line stripes.

Generally, when thermoplastic is used, stripes are usually applied in thicknesses of sixty to a hundred and twenty-five thousandths of an inch. Specifically, they are usually applied at ninety to one hundred and twenty-five thousandths of an inch.

An example of a traffic stripe applicator is the Mini Mac 150 by Marcato Enterprises, Inc. The Mini Mac 150 is generally considered to be what is known as a handliner, mainly because it is manually propelled. The Mini Mac 150 includes an oil heated holding tank and thermoplastic pump as well as a thermoplastic application housing to perform adjustable line widths from four inches to twelve inches. Since, however, the thermoplastic application housing lies co-linear with the axle on the front wheels, a transverse line such as a crosswalk cannot apparently extend closer then sixteen inches to a curb. In addition, despite locking the lone rear wheel, the Mini Mac 150 has difficulty in laying down long straight lines. Long line application with the Mini Mac 150 is also difficult, because the Mini Mac has a limited capacity of only one hundred fifty pounds of thermoplastic material. Also, although two solid lines can be applied by the one thermoplastic assembly of the Mini Mac 150, one would have to make two separate trips to lay down a solid line with an adjacent interrupted line.

The Mini Mac 1000 by Marcato Enterprises, Inc. includes four wheel steering for long line operation. The Mini Mac 1000 also includes a thermoplastic applicator which is attached to the frame. Since the applicator is mounted on the vehicle frame, the applicator does not turn at the same angle as the adjacent front wheel. Thus, in curved line applications, when for example, a twelve inch line is being applied, the line width will likely narrow to about seven inches as the radius of the curve about which the applicator travels gets smaller. Thus, instead of a twelve inch width curved stripe, one would end up with an undesirable narrowing curve.

U.S. Pat. No. 3,477,352 to Harding et al. discloses a system for controlling the operation of its spray gun so that interrupted lines can be applied. Harding, however, fails to address many problems for both long lines and for transverse markings which the present invention overcomes.

It is desirable to have an apparatus perform both high production straight and curved lines. This capability is important especially in medium size jobs where, for example, there has been a resurfacing of an intersection. In such a situation, one must have the capability to apply relatively high-speed long lines and to apply a plurality of transverse markings in a relatively fast time. In these medium size applications, one can not usually justify the high cost associated with a large long line striping truck to apply, for example, approximately 2,000 feet of long lines. However, if one tried to use handliners in such an application, it would likely be relatively slow, relatively imprecise and costly in labor.

In summary, there is a need for an apparatus which can perform precision long lines in a more cost-efficient manner and there is also a need for an apparatus which can perform accurate transverse markings in a more cost-efficient manner.

SUMMARY OF THE INVENTION

The preferred apparatus for applying a traffic stripe includes a vehicle including a pair of front wheels and a pair of rear wheels and members, disposed on the vehicle, for steering the front wheels. Also included is a traffic stripe applying system, disposed outward of the front wheels and adjacent to one of the front wheels, for applying a traffic stripe to a road. A connector pivotally connects this applying system to the vehicle and defines an axis about which the applying system pivots relative to the vehicle. In addition, connected to the applying system, disposed forward of the pivot axis and acting in response to the steering of the front wheels, is a member or members for turning the stripe applying system in the same direction as the front wheels when the front wheels are turned.

Preferably, this turning member or members also turns the traffic stripe applying system at a greater angle than the front wheels when the front wheels are turned in a direction towards the applying system. With the applying system turning at a greater angle than the front wheels, one can apply a curved line which does not narrow as one makes the curve. Thus, transverse markings can be done relatively fast, precise and possibly even by freehand without the burdensome use of stencils.

Another preferred embodiment includes an apparatus for applying a continuous reflective stripe and an adjacent interrupted reflective stripe to a road. This apparatus includes a vehicle including at least three wheels and a frame. The apparatus further includes a system, connected to the vehicle, for applying reflective stripes to the road. This reflective stripe applying system includes, an assembly for spraying a plurality of thermoplastic stripes generally parallel to a center line of the frame of the vehicle when the wheels of the vehicle are aligned substantially parallel to the center line of the frame of the vehicle and, an assembly, disposed rearward of and in alignment with the thermoplastic spraying assembly, for spraying reflective material over the plurality of thermoplastic stripes. The thermoplastic spraying assembly also has a housing including first and second outlets. This apparatus also includes controls, connected to the housing, for controlling the thermoplastic spraying assembly so that one of the outlets of the thermoplastic spraying assembly housing can be continuously open for spraying a thermoplastic stripe on the road while the other of the outlets can be intermittingly opened for spraying thermoplastic stripes for predetermined lengths on the road and intermittingly closed to prevent spraying for predetermined gaps. In addition, this apparatus includes elements, connected to the reflective material spraying assembly, for controlling the reflective material spraying assembly so that the reflective material is primarily sprayed only over the plurality of thermoplastic stripes.

The various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and the accompanying descriptive matter, in which there is illustrated and described preferred embodiments of the invention.

BRIEF DESCRIPTION OF THE DRAWINGS

FIG. 8 is a plan view illustrating a preferred relationship of a steering system to the vehicle in accordance with the present invention;

FIG. 9 is a partial plan view of a portion of FIG. 8;

FIG. 13 is a bottom view of a thermoplastic spraying assembly and thermoplastic receiving element of FIG. 1;

FIG. 14 is a rear view of spraying assembly elements of FIG. 13;

FIG. 15 is a plan view of a bar as in the thermoplastic spraying assembly representation of FIG. 12;

FIG. 16 is a plan view of a shorter bar than the bar of FIG. 15;

FIG. 17 is a side view of a rod and die of the thermoplastic spraying assembly of FIGS. 1-3 and 5-7 and partially seen in the representation of FIG. 12;

FIG. 18 is a bottom view of a first outlet as in the thermoplastic spraying assembly representation of FIG. 8;

FIG. 19 is a side view of a rod and die of the thermoplastic spraying assembly;

FIG. 20 is a bottom view of a third outlet as in FIG. 8;

FIG. 21 is a side view of a rod and die of the thermoplastic spraying assembly;

FIG. 22 is a bottom view of a second outlet as in FIG. 8;

FIG. 23 is a side view of a side plate of FIG. 14;

FIG. 29 is a bottom view of a preferred slider holder in accordance with the present invention;

FIG. 30 is a side view of the slider holder of FIG. 30;

FIG. 31 is a top view of a slider for use in the holder of FIGS. 29 and 30;

DETAILED DESCRIPTION OF THE DRAWINGS

Figure 1:
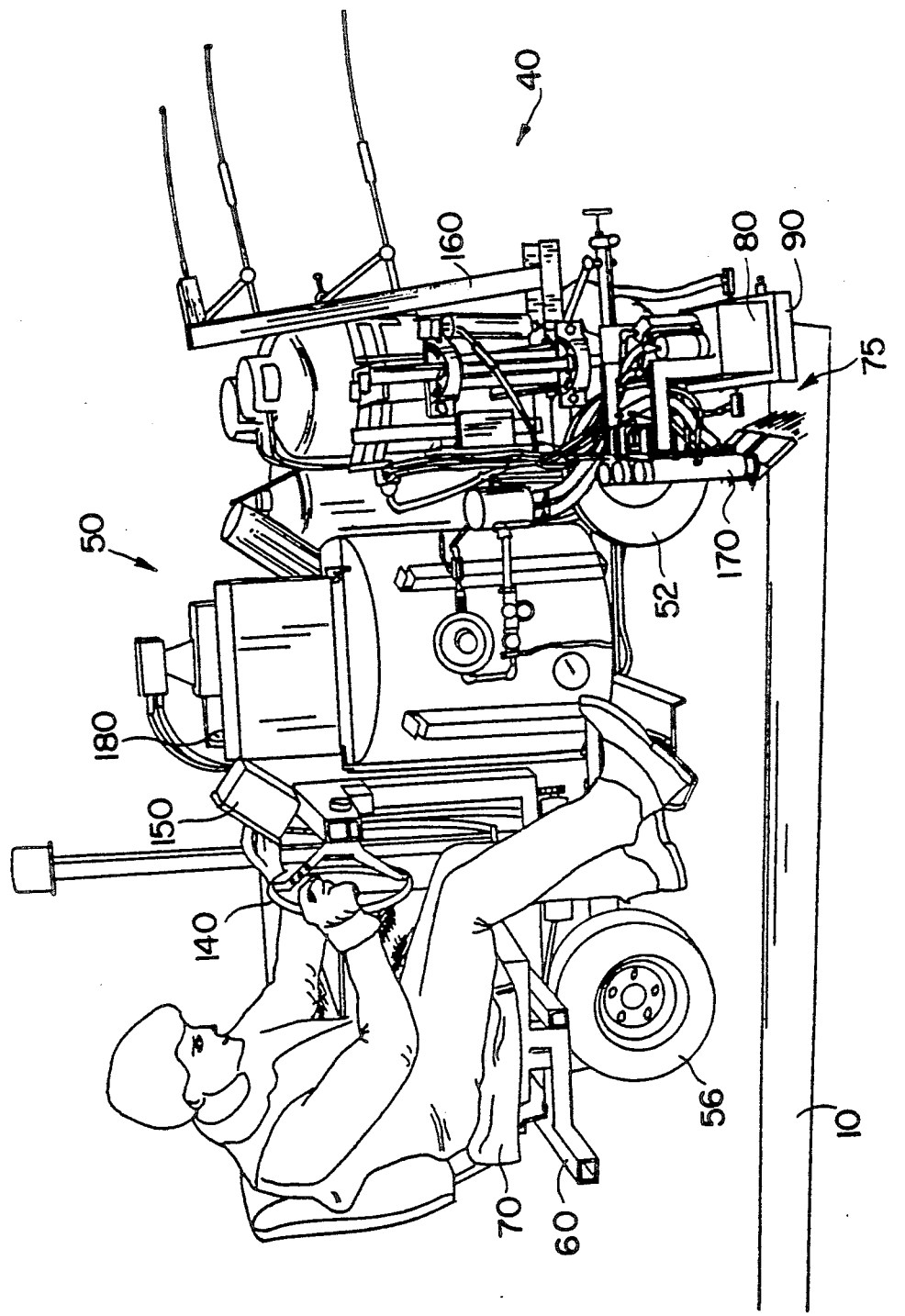
FIG. 1 is a right-side view of a preferred embodiment of an apparatus for applying a traffic stripe to a road in accordance with the present invention.

A preferred apparatus 40 for applying traffic stripe 10 is shown in FIG. 1. Apparatus 40 includes vehicle 50, a pair of front wheels 52 and 54 and a pair of rear wheels 56 and 58. An engine for propelling the vehicle up to six miles per mile in a forward or reverse direction and a variable speed hydrostatic drive are also preferred.

Included on vehicle 50 of FIG. 1 is a frame extension 60 with a seat 70 for supporting a driver. Driver supporting seat 70 is disposed between the front and rear wheels and on the same side of the vehicle as traffic stripe applying system 75.

Also included in this apparatus is a system, disposed on the vehicle, for steering the front wheels. This system includes steering wheel 140, adjacent supporting seat 70 of FIG. 1, for manually controlling the direction of steering.

The preferred apparatus is designed primarily for precision transverse line striping including arrows, words such as "ONLY", cross-walks, railroad crossings, stopbars, etc. It is expected that this apparatus can do medium size transverse line jobs at least two to three times faster than conventional headliners. The preferred apparatus also has the capability of doing relatively high-speed precision long line striping such as 4-inch, 8-inch or 12-inch solid lines, 4-inch interrupted or skip lines, double 4-inch yellow lines and one solid line with one adjacent interrupted line.

Figure 3:
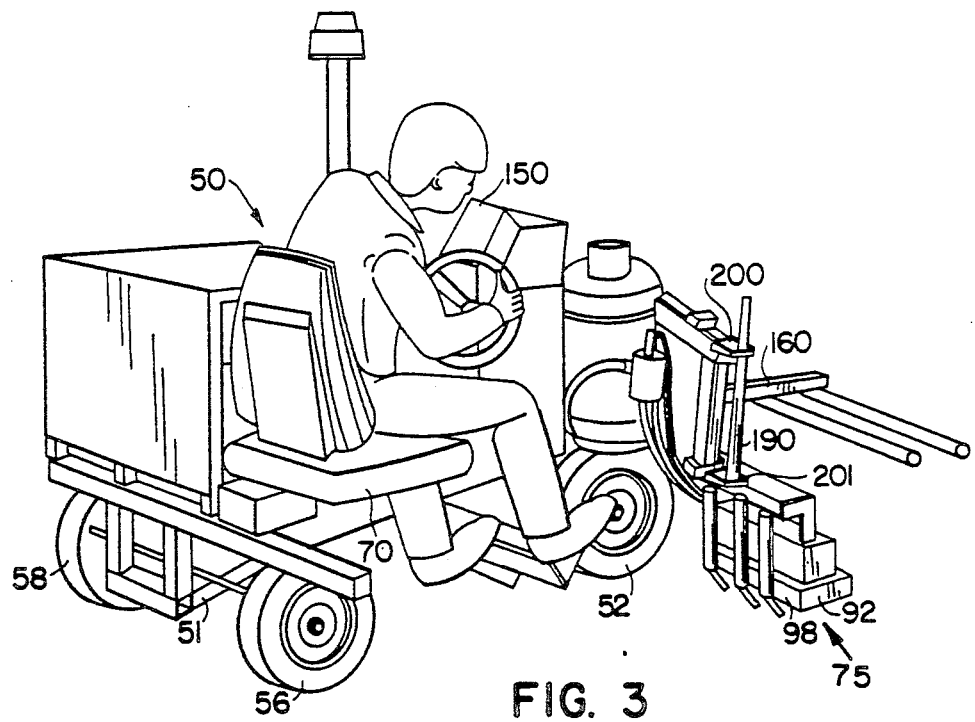
FIG. 3 is a right-side perspective view of the apparatus of FIG. 1.

Disposed outward of front wheels 52 and 54 and adjacent of the front wheels in FIG. 1 is system 75 for applying a traffic stripe to a road. With this system, line widths can be easily adjusted from the drivers seat through the use of electrical switches mounted on control box 150 as seen in FIG. 3. For example, as seen in FIG. 1, the driver is laying down a solid stripe for a crosswalk or stopbar.

Thermoplastic is a durable marking material which should last up to ten times as long as traffic paint on the same location. Thus, although a system can be located as shown for applying traffic paint, cold tape, epoxy or other materials to form a traffic stripe, it is preferable to use thermoplastic striping assembly 80.

The resin thermoplastic is heated in accordance with well-known principles. The thermoplastic is normally heated in a tank to between 380° and 450°, but preferably approximately 400°. This heated thermoplastic is then generally delivered through gravity pressure or under pressure from a pump to applying assembly 80. Thermoplastic is normally applied in generally straight lined stripes and it bonds to the road. Although thermoplastic bonds better on asphalt surface, it can be effectively used on concrete surfaces.

There are at least two different methods for applying thermoplastic to the road. One is an extrusion assembly and the other is a ribbon gun or airless ribbon gun assembly. The extrusion assembly lays stripes of thermoplastic on the road and then cuts the stripe with a blade at desired line ending points. Since extrusion systems require a cutting blade close to the surface of the road, they have certain drawbacks. For example, when the system hits rocks in the road, the blade could be damaged or the cutting could be disrupted. In either case, the precision or the depth of the line is affected. Also, when different line widths are desired, such as going from 4-inches to 8-inches or 12-inches, one must normally remove a bottom with one size outlet from the extrusion assembly and take approximately ten minutes to safely install a new extrusion bottom with another size outlet.

In contrast, a ribbon gun or airless ribbon gun assembly sprays thermoplastic through outlets on to the road which in turn then bond to the road. Thus, there is no blade for rocks in the road to effect. In addition, the ribbon gun assembly allows for adjusting the line width from, for example, 4 to 8 to 12-inches without having to manually replace bottom outlets on ribbon gun or thermoplastic spraying assembly 80. Thus, although the extrusion assembly could be used in a housing having an outlet through which the thermoplastic would be applied to the road and then cut, it is more advantageous to use a ribbon gun or thermoplastic spraying assembly 80 which will be described in further detail herein.

Though not necessary, it is also preferred that reflective material be added on top of the thermoplastic material so that the lines can be seen at night. The reflective material primarily consists of fine glass beads. The reflective material is preferably applied through an assembly 170 which is disposed rearward of and in alignment with ribbon gun or thermoplastic spraying assembly 80.

There are going to be instances when a line is being applied and a front of the vehicle will be facing a curb. For example, laying a crosswalk or a stopbar presents this situation. The preferred traffic stripe applying apparatus 40 can apply a stripe within six inches of a curb on a road. To facilitate applying a stripe so close to a curb, an outlet of assembly housing 90 and, indeed in a preferred embodiment, even housing 90 is disposed in front of a center line of an axis of front wheels 52 and 54.

Also seen in FIG. 1 is retractable guide arm 160 connected to vehicle 50 and projecting forward of the vehicle. In addition, shown is gauge 180 which can be read by the driver on supporting seat 70. These two elements will also be described further herein.

Figure 2:
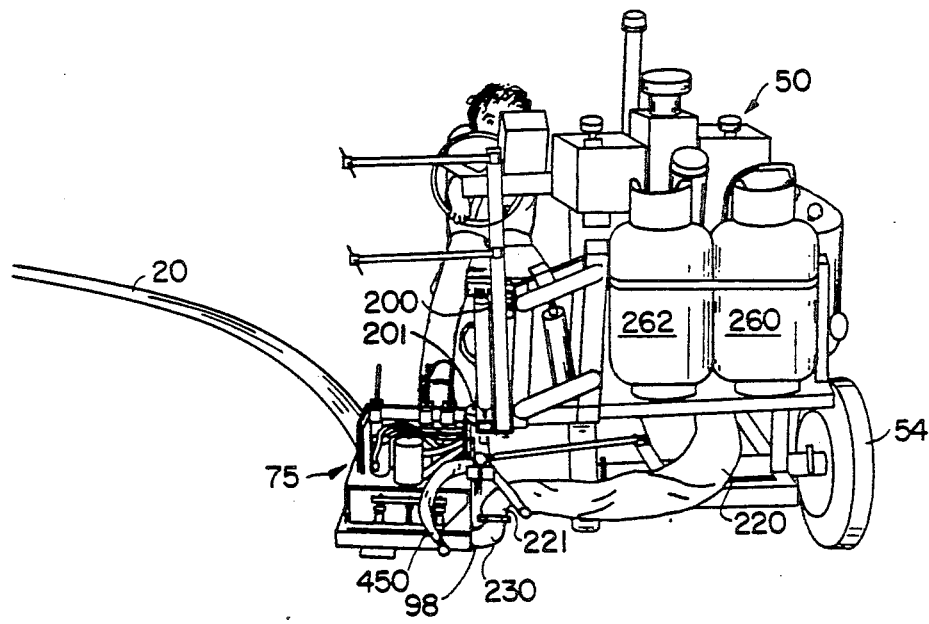
FIG. 2 is a front view of the apparatus of FIG. 1.

FIG. 2 shows a front view of apparatus 40. In FIG. 2, the apparatus is applying stripe 20 while coming around a curve. FIGS. 1 and 2 illustrate that a preferred apparatus has the capability of both straight line and curved travel.

Apparatus 40 includes rod 190 and rod supporting members 200 and 201 for pivotally connecting traffic stripe applying system 75 to vehicle 50. Rod 190 defines an axis about which applying system 75 pivots relative to vehicle 50.

Apparatus 40 also includes members, connected to the stripe applying assembly, disposed forward of the pivot axis and acting in response to the steering of the front wheels, for turning stripe applying system 75 in the same direction as front wheels 52 and 54 when the front wheels are turned. These members for turning will be further described herein.

Also shown in FIG. 2 is tube 220 extending from vehicle 50 to assembly housing 90. The tube is a substantially inflexible tube which delivers thermoplastic from the vehicle to the housing. This tube preferably has an elbow-shaped fitting 221 which is threadably attached to thermoplastic assembly housing 90 through a thermoplastic receiving element 230. This receiving element, which is either integrally or separately connected to housing 90, is approximately aligned with the pivot axis of the pivotally connecting rod 190 and in fluid communication with thermoplastic spraying assembly housing 90 for receiving the thermoplastic from tube 220. This receiving member can be made to rotate relative to the tube as the thermoplastic spraying assembly housing rotates.

FIG. 3 shows a right-side perspective view of the preferred apparatus. Although only one traffic stripe applying system 75 is shown, additional traffic stripe applying systems could be added.

The thermoplastic stripe assembly 80 includes, as shown, housing 90 preferably having four sides 92, 94, 96 and 98 and an outlet through which the thermoplastic is applied to the road. These pivotally connecting members 190, 200 and 201 are disposed along side 96 of housing 90 which is nearest to the front wheels.

Figure 4:
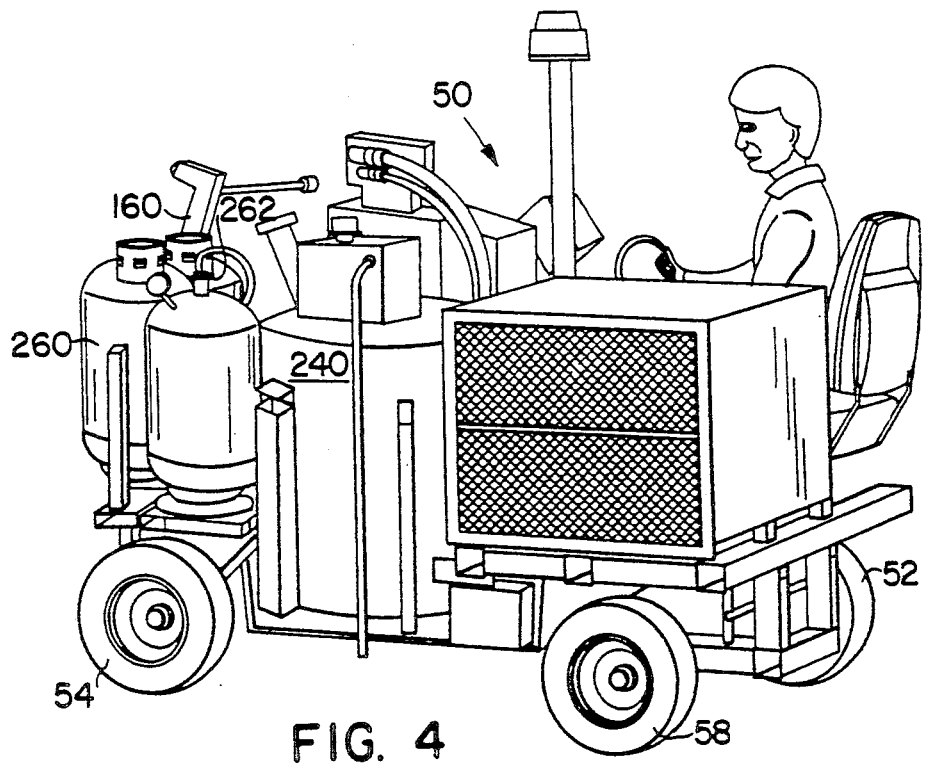
FIG. 4 is a left-side perspective view of the apparatus of FIG. 1.

FIG. 4 shows the left or opposite side of the preferred apparatus. Although a four-wheel vehicle is shown, in certain situations a three-wheel vehicle could be used. The overall length of the apparatus, not including guide arm 160 which can extend downward from the front, is approximately six feet or preferably 74 inches.

As shown in FIG. 4, vehicle 50 holds tank 240 of thermoplastic. The thermoplastic material holding tank advantageously has a capacity of 400 pounds.

Under the holding tank is a burner for heating the thermoplastic from between 350° and 450°. Preferably, two thirty-pound propane tanks 260 and 262 are used for the heating system. Sometimes the thermoplastic is heated and then immediately conveyed to the road and other times it is heated and stored before conveyance to the stripe application system.

Preferably the apparatus uses a heavy duty hydrostatic drive system. This system uses an infinitely variable speed drive for forward and reverse with a single foot control pedal. It also serves as the primary braking system. In addition, included is an optional emergency air operated friction brake located on the rear wheels. A twenty horsepower engine can power the system. The preferred empty weight of this apparatus is approximately 800 pounds.

Figure 5:
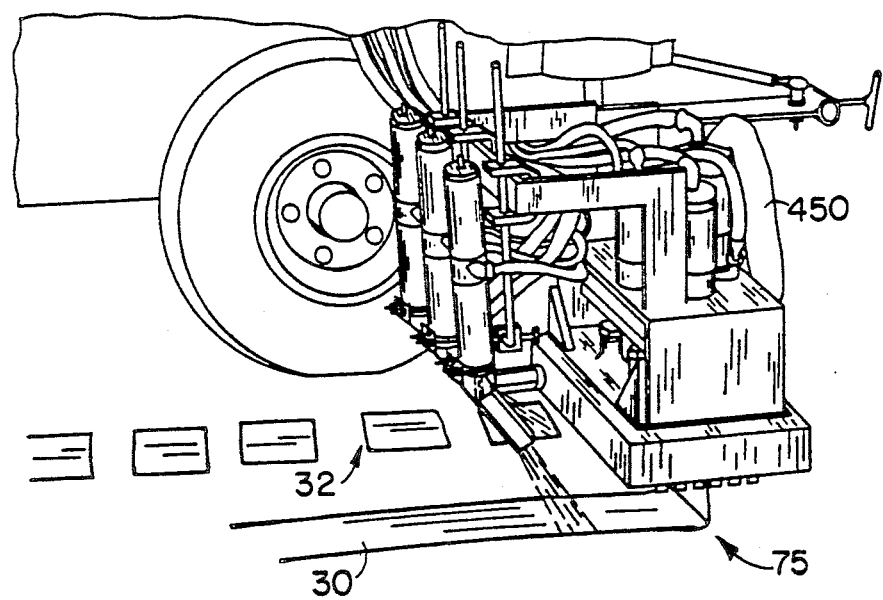
FIG. 5 is a partial view of the right-side of the apparatus of FIG. 1 illustrating a traffic stripe applying system.

FIG. 5 shows traffic stripe applying system 75 laying down a continuous reflective stripe 30 and, in addition, interrupted reflective stripes 32 on a road. In this instance, the traffic stripe applying system sprays the thermoplastic stripe, which is generally parallel to the center line of the vehicle, when the wheels of the vehicle are aligned substantially parallel to the center line of the vehicle. Also shown is an assembly 170, disposed rearward of and in alignment with ribbon gun or thermoplastic spraying assembly 80, for spraying reflective material over the thermoplastic stripe. Preferably, the reflective material is held in a tank on the vehicle with a capacity of approximately 125 pounds and is fed, when desired, under a pressurized system.

To apply this interrupted reflective stripe and a continuous reflective stripe from one ribbon gun or thermoplastic spraying assembly 80 requires a certain arrangement of assembly outlets as will be described herein. Also required are controls for controlling opening and closing of a portion of this assembly so that the stripes and gaps of predetermined length can be repeatedly applied. Such an electronic control means to direct the appropriate mechanical elements in assembly 80 is described in U.S. Pat. No. 3,477,352 to Harding et al., which is hereby incorporated by reference. These electronic control means described in U.S. Pat. No. 3,477,352 to Harding can also control reflective material spraying system 170 so that the reflective material is primarily sprayed only over the plurality of thermoplastic stripes of FIG. 5.

Figure 6:
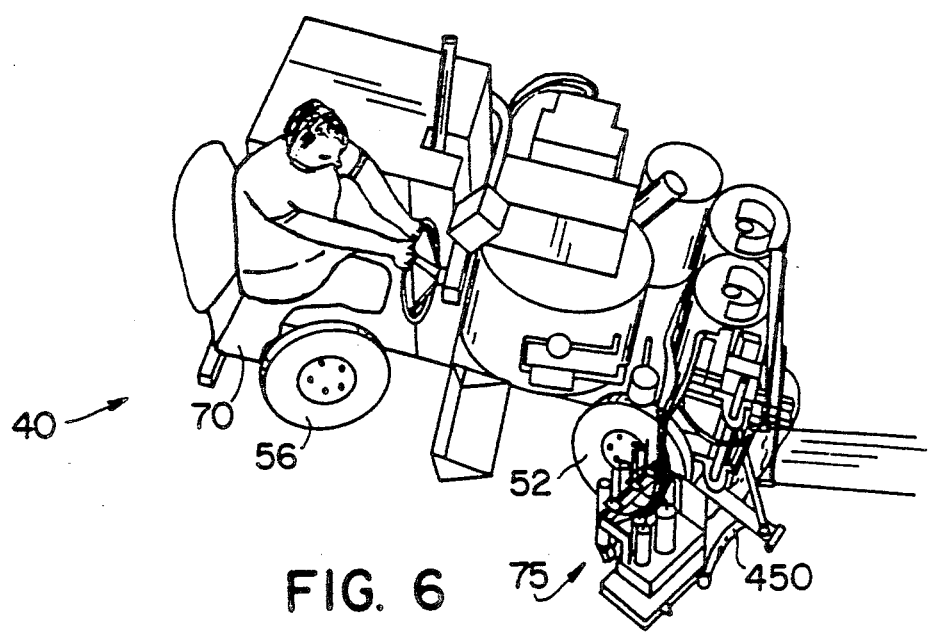
FIG. 6 is a right-side perspective view of the apparatus of FIG. 1 with a portion of the driver and driver's seat cut-away to illustrate the right-side front and rear wheels being turned in opposite directions.

FIG. 6 shows a perspective view of the right-side of apparatus 40 with a portion of the driver and driver supporting seat 70 cut-away for clarity. Apparatus 40 includes a four-wheel power steering system. In particular, as seen in FIG. 6, this preferred apparatus includes a system, disposed on the vehicle, for steering rear wheels 56 and 58 in a direction opposite to the direction front wheels 52 and 54 are steered. Such a four wheel steering system allows one to lay straight precision long lines. Also, when laying down a curve with a tight radius, the traffic stripe will not likely be hit by rear wheel 56. In addition, when combining this four wheel opposite direction steering with an outlet of assembly 80 being in front of the front axle center line, one obtains good control when turning. Furthermore, although cut-away in FIG. 6, control is further enhanced with the driver supporting seat extending outward from an area defined by the four wheels.

Figure 7:
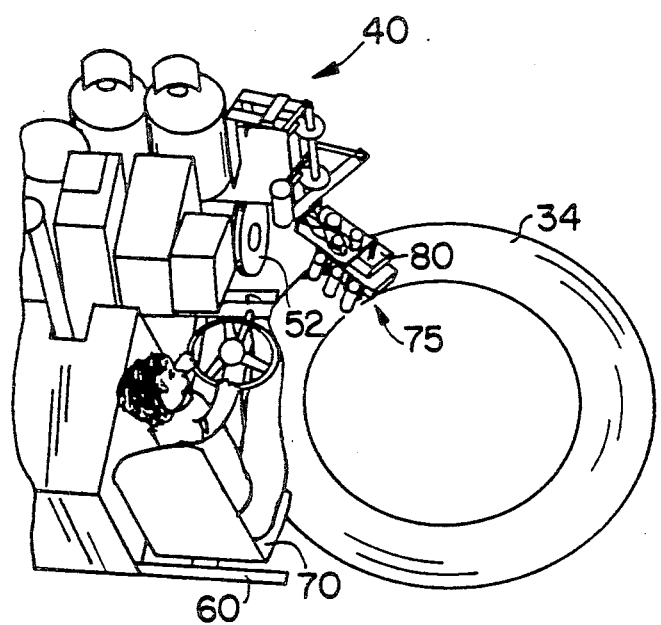
FIG. 7 is a top perspective view of a right-side portion of the apparatus of FIG. 1 illustrating a curved stripe as applied by the apparatus of FIG. 1 which has formed a circle.

FIG. 7 shows a partial perspective of the right portion of apparatus 40 and a curved stripe forming a circle 34 which was laid down by the apparatus. When turning to the right in FIG. 7, the stripe applying system turns about a lower circumference than the front wheels. With this apparatus, the turning members turn stripe applying system 75 in the same direction and at a greater angle than the front wheels when the front wheels are turned in a direction towards the stripe applying system. By turning the stripe applying system at a greater angle than the front wheels when this embodiment is turning to the right in FIG. 7, the stripe applying outlets on assembly 80 apply a thermoplastic stripe which is substantially perpendicular to a line along the circumference of this narrower circle. Thus, as seen in FIG. 7, the stripe has a substantially consistent line width throughout the complete curve.

The apparatus shown in FIG. 7 can have traffic stripe applying system 75 apply a curved stripe along a circle having a radius of as little as two feet. Practically, however, having a turning radius slightly less than two and half feet will serve most curved stripe applications.

Whereas in the past, stencils were usually used to draw curved markings such as arrows and letters, the apparatus of FIG. 1–7 makes it possible to apply such markings freehand. The usual way for applying arrows, railroad crossing, words, and other markings and legends is to lay down a stencil or borders and make a plurality of straight line passes over the stencil or the borders. Then, a putty knife is often used to cut the traffic stripe applying material at the stencil before it is lifted. Whereas with the ability to make tight turns without losing line width, the apparatus of FIG. 7 allows reasonably precise free-hand drawing of the same markings and legends to dramatically increase the speed and, thus, reduce the costs of applying a plurality of such markings and legends.

In the apparatus of FIG. 7, driver supporting elements 60 and 70 are primarily disposed outward of an area defined by the front and rear wheels. Having these outward extending supporting elements on the same side as stripe applying system 75 and outward of the wheels improves the drivers ability to control the direction of the stripe applying system in both tight turns and long line applications.

FIGS. 8–11 illustrate a relationship of a steering system to a vehicle which allows stripe applying system 75 to turn left or right with the front wheels for precision line tracking. FIGS. 8–11, as well as FIGS. 12, 32–34 and 36, are used to represent the material relationships of elements and are not necessarily identical to the exact structures used in the apparatus of FIGS. 1–7.

Shown in FIG. 8 is vehicle frame 51, front axle 280 and rear axle 290 attached to the frame. Wheel spindles 300, 302, 304 and 306 are attached to both ends of each of the axles. The spindles 300 and 302 are rotatably attached to the front axle. Also, four wheels 52, 54, 56 and 58 are shown with each wheel mounted on one of the wheel spindles. The wheel base is preferably less than five feet and more preferably approximately 51 inches. The wheel track is preferably approximately 38 inches.

A preferred system 310 for steering the front wheels includes a rotatable steering or idler linkage 312 disposed adjacent front axle 280. It also includes a steering gear or the like 314, disposed adjacent the front axle and connected to steering linkage 312, for rotating the steering linkage in response to a directional output. Also included are a pair of steering arms 316 and 318, with each arm connected to one of the front wheel spindles 300 and 302, for transferring motion to the front wheel spindles. In addition, in this steering system is a tie rod 320 connected to each steering arm 316 and 318. Furthermore, included is rod 322, connected to steering linkage 312 and one of the steering arms 316, for rotating at least one of the steering arms in response to rotation of steering linkage 312.

The preferred elements for turning stripe applying system 75 include an applying assembly system linkage 330, having a first end 332 disposed forward of the pivot axis and rotatably attached to applying system 75 by arm 88 and connector 87 of assembly 80. Linkage 330 has a second end 334 extending in a direction generally towards frame 51 of the vehicle. In addition, shown in FIGS. 8 and 9 is an applying assembly rotation directing arm 340 having a first end 342, connected to steering arm 316, which is closet to the stripe applying system, which moves responsive to movement of the front right wheel steering arm 316 to which it is connected. Arm 340 has a second end 344 disposed inward from the front wheel steering arm 316 to which it is connected, and connected to second end 334 of applying system linkage 330. As seen in FIG. 8, the second end 344 of linkage 340 is preferably disposed inward from front wheel 52 adjacent the stripe applying system at an angle of approximately 20° relative to a center line X—X of the vehicle frame when the front wheels are substantially parallel to the center line X—X of the vehicle frame as in FIG. 8.

Although the apparatus is not limited to a thermoplastic stripe spraying assembly 80, such an assembly is shown in FIG. 8 to illustrate further advantages of the improved preferred thermoplastic stripe applying assembly. Illustrated in FIG. 8 are three outlets 82, 84 and 86 which lie in the bottom of the applying assembly. These outlets are of varying width. Front outlet 82 is preferably for a line 12 inches in width, intermediate outlet 84 is for a line 4 inches width and rearward outlet 86 is for a line 8 inches in width. Each of these outlets are preferably aligned adjacent a side of the assembly which is parallel to the front wheels when the front wheels are substantially parallel to center line X—X of the vehicle frame. In addition to other advantages to be described herein, this alignment of one side of the plurality of outlets along one side of the housing allows the operator to use guide arm 160, substantially in line with this far end of the outlets, to obtain guidance in applying stripes no matter which combination of the plurality of outlets are operating.

Also as illustrated in FIGS. 8—11, assembly 80 is preferably disposed outward from an adjacent one of the front wheels and outside of an area defined by the wheels of the vehicle. In addition, each outlet of the assembly is disposed in front of center line Y—Y of the front wheel axis. Furthermore, FIGS. 8—11 illustrate three pressure-type bead guns 172, 174 and 176 of system 170 of FIGS. 1 and 5, disposed rearward of and in alignment with the ribbon gun or thermoplastic stripe spraying assembly, for spraying reflective material over the thermoplastic stripe.

FIG. 9 shows a partial view of FIG. 8 to further illustrate the relationship of inward directed linkage 340 to the front wheel 52 most adjacent stripe applying system 75. Linkage 340 has one end 342 welded to steering arm 316, via a post, which moves in response to steering of front wheels 52 and 54 and in the same direction as the front wheels. Linkage 340 is connected to a post which is welded to steering arm 316 to avoid contact with other steering system linkages and the front wheels so that linkages 330 and 340 will not be broken as the stripe applying system 75 is raised to a higher position for travel of the vehicle without applying stripes. Furthermore, as shown in FIGS. 8 and 9, second end 344 of linkage 340 is preferably disposed forward of first end 342 of the linkage 340 and further inward from applying system 75 than first end 342 of linkage 340 when the front wheels are substantially parallel to a center line X—X of the vehicle frame.

Also shown in FIGS. 8 and 9, is linkage 330 having a first end 332 rotatably connected, through arm 88 and connector 87 of assembly 80, to stripe applying system 75 and disposed forward of pivoting rod 190. Linkage 330 has second end 334 extending in a direction generally towards the vehicle. Second end 344 of the linkage 340 is also rotatably connected to the second end 334 of linkage 330. Although other structures for accomplishing the turning of system 75 at a greater angle than the front wheels when the front wheels are turned are within the scope of the invention, the structure of FIGS. 8-11 provides an example of the preferred relationship of elements for implementing the steering and turning of the apparatus.

Figure 10:
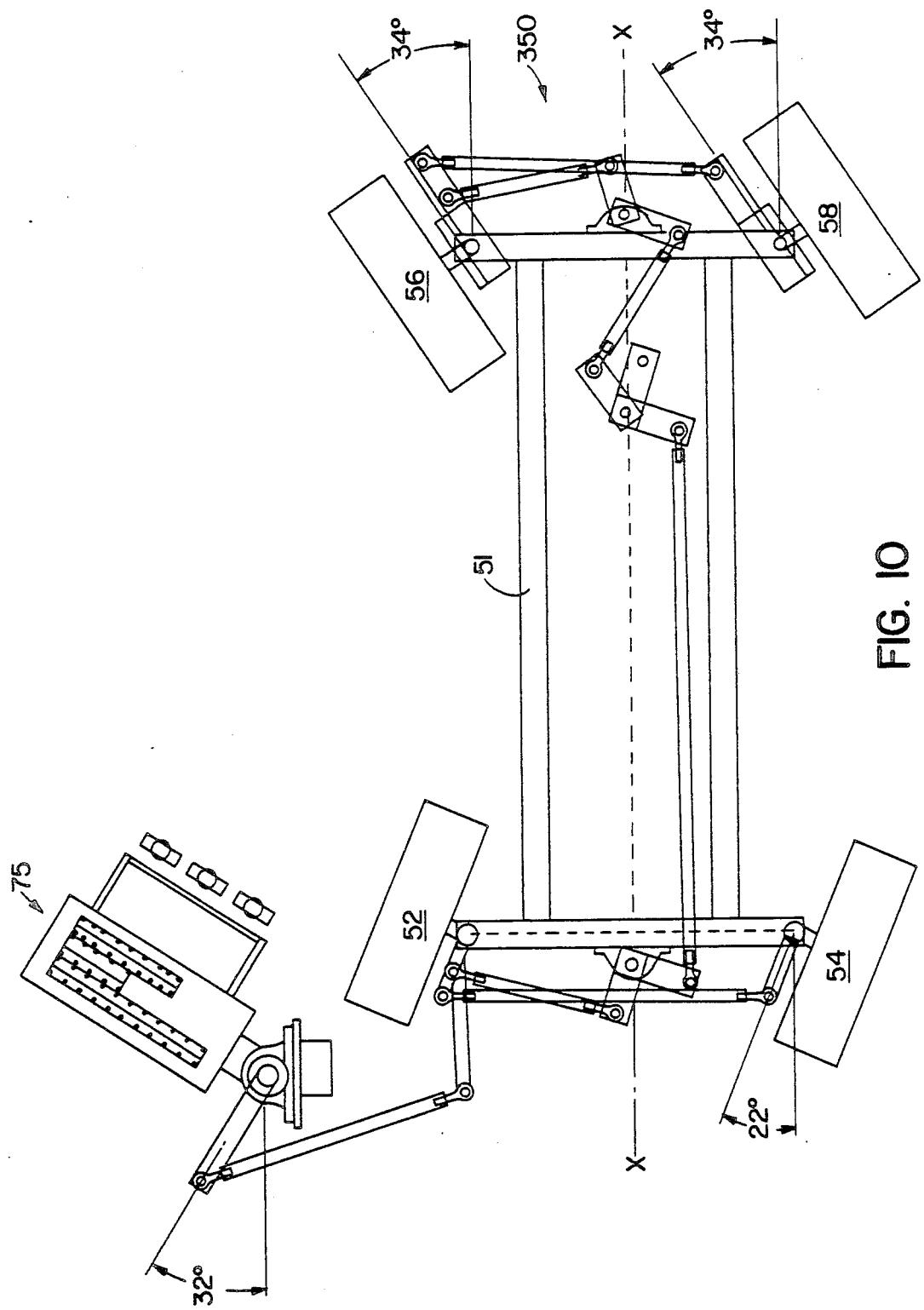
FIG. 10 is a plan view similar to that of FIG. 8 illustrating the front wheels and traffic stripe applying system turned in one direction and the rear wheels turned in an opposite direction.

Shown in FIG. 10 is the housing of stripe applying system 75 pivotally connected to the vehicle and turning in the same direction and at a greater angle than the front wheels as the front wheels are turned. In particular, the traffic stripe applying system turns in FIG. 10 at an angle relative to a center line X—X of the vehicle frame of up to 10° more than the front wheels when the front wheels are turned in a direction towards the stripe applying system. In particular, shown is the stripe applying system turned at 32° relative to center line X—X while the front wheels are turned 22° relative to center line X—X. Although the front wheels could be turned at slightly different angles to compensate for the differences in the length of the circumference of the circles about which they would travel, the assembly of FIG. 10 shows the front wheels turned at the same angle.

Also shown in FIG. 10 is a part of steering system 350, disposed on the vehicle, for steering rear wheels 56 and 58 in a direction opposite to the direction front wheels 52 and 54 are steered. It is preferred, as seen in FIG. 10, that when the wheels are being turned by the front and rear wheel steering systems, the rear wheels turn at a greater angle relative to a center line of the vehicle than do the front wheels. Furthermore, it is preferred that approximately 60% of the steering of the vehicle is done by the rear wheels and approximately 40% of the steering of the vehicle is done by the front wheels. For example, as shown in FIG. 10, rear wheels 56 and 58 will turn the vehicle approximately 34° relative to center line X—X in one direction while the front wheels will turn the vehicle approximately 22° relative to center line X—X in an opposite direction so that the rear wheels do approximately three-fifths or 60% of the steering. Such a structure allows for greater control during long line striping. Also, such a structure allows for further swinging of the rear wheels away from a new curved traffic stripe to avoid contact between a new curved stripe and the rear wheels.

Figure 11:
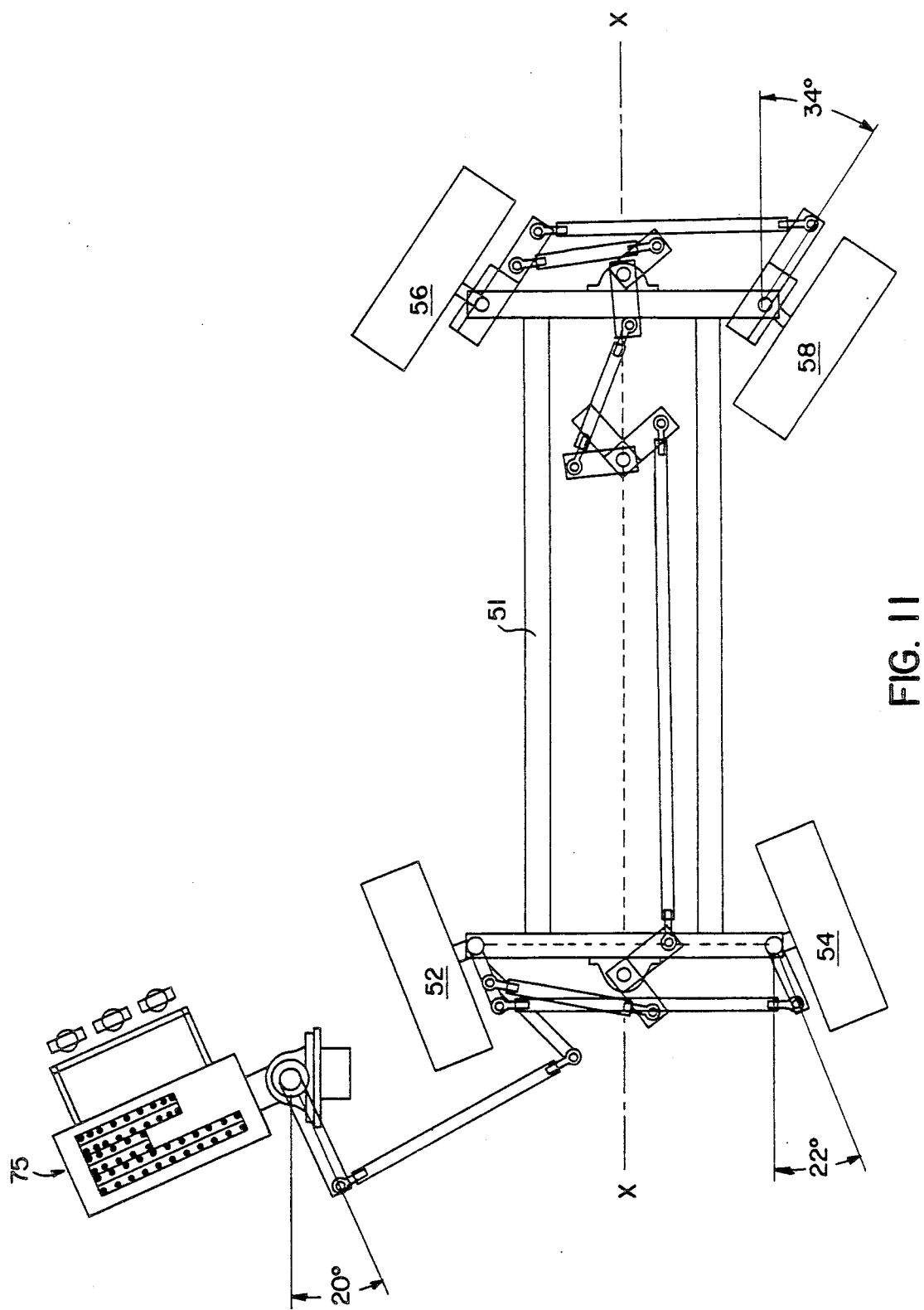
FIG. 11 is a plan view similar to that of FIG. 8 illustrating the wheels and traffic stripe applying system turned in an opposite direction to that of FIG. 10.

FIG. 11 illustrates that when turning, in this case to the left, stripe applying system 75 travels about a larger circumference than the front wheels. Thus, while the wheels turn at approximately 22°, the stripe applying systems turn at a lesser angle of approximately 20°. In the alternative, for example, where the direction of travel of vehicles on the road is opposite to the United States, the applying assembly could be placed on the opposite side of the apparatus. In such a situation, the tighter turning radius of the stripe applying system would be done with left turns of the front wheels.

In FIG. 11, as in FIG. 10, the rear wheels are being turned in a direction opposite to the direction the front wheels are steered. Also, as in FIG. 10, the rear wheels are turning at a greater angle relative to a center line position of the vehicle than are the front wheels, and approximately 60% of the steering of the vehicle is done by the rear wheels while approximately 40% of the steering is done by the front wheels.

Figure 12:
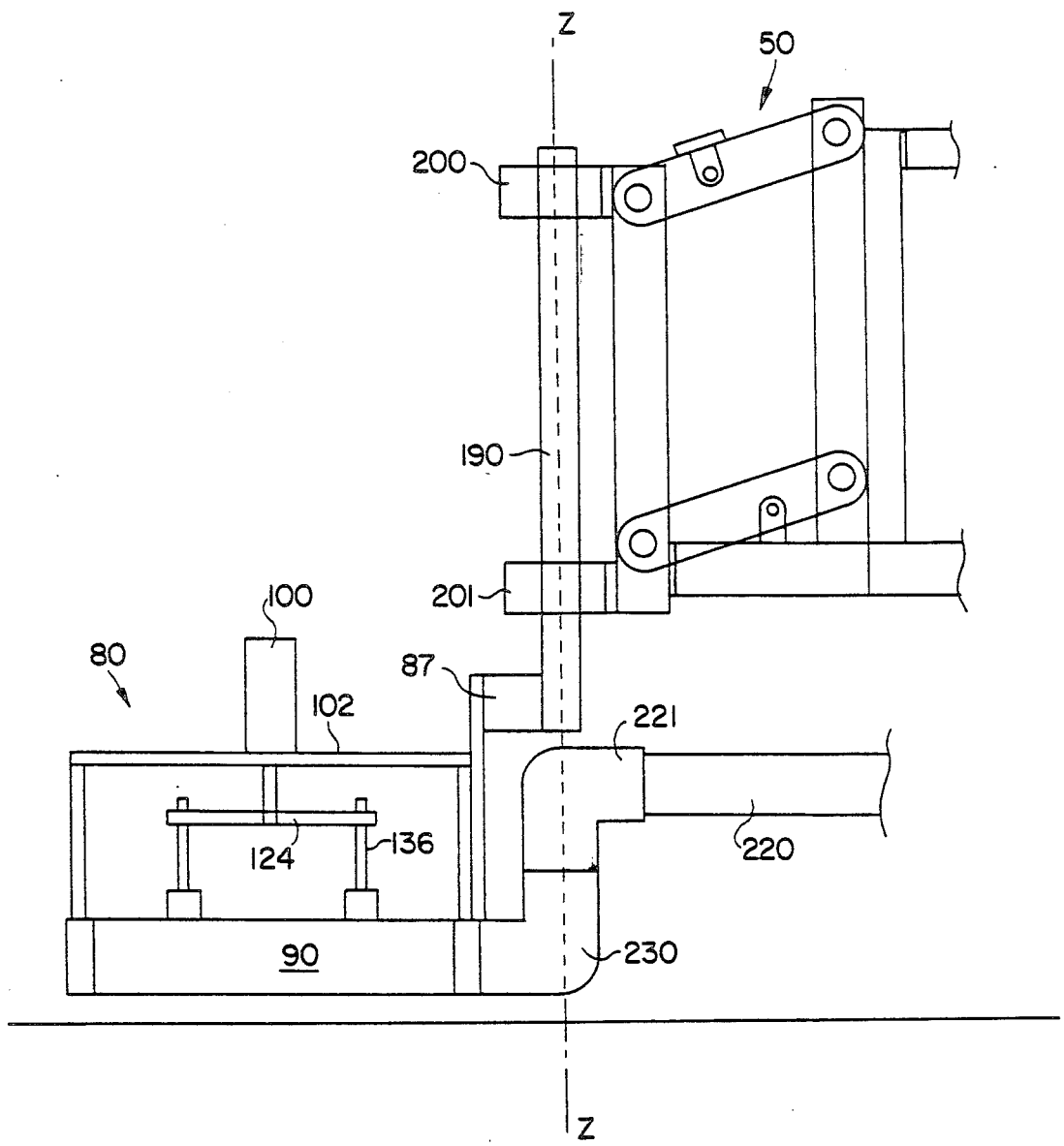
FIG. 12 is a partial front view illustrating preferred connections of the traffic stripe applying system to the vehicle frame.

FIG. 12 illustrates a partial view of thermoplastic spraying assembly 80, vehicle 50, the connection between the assembly and the vehicle and the connection of the thermoplastic delivering tube 220 to the assembly. Shown in FIG. 12 is fitting 230, approximately aligned with pivot axis Z—Z of the assembly to vehicle connecting rod 190 which is in fluid communication with thermoplastic spraying assembly housing 90. Fitting 230 receives heated thermoplastic from the thermoplastic delivering tube 220.

This receiving fitting has an opening shown in FIGS. 13-15 which is disposed upward. The opening has a center line extending substantially vertically through the opening which is disposed parallel with pivot axis Z—Z of the connecting structure. Although, it is preferable that the fitting center line is co-linear with pivot axis Z—Z, the desired advantages can likely be obtained if the two lines are within two inches of each other. The principal advantage of this preferred connection is that tube 220 for delivering heated thermoplastic from vehicle 50 to housing 90 of airless ribbon gun or thermoplastic spraying assembly 80 will undergo little movement. Minimizing movement of the tube is especially advantageous when the preferred substantial inflexible tube is used.

The preferred tube has a two inch inner cylinder for transporting thermoplastic and a 4 inch outer casing defining a gap for surrounding the inner cylinder with heated oil. Having this heated oil encapsulating the inner cylinder keeps the thermoplastic near its application temperature of 400°, but creates a hose which is very difficult to bend. Thus, although not necessary to form a connection, it is preferred to have the connection of the fitting center line approximately aligned with pivot axis Z—Z of the thermoplastic spraying assembly to vehicle connecting rod 190.

It is further preferred that fitting 230 rotate as thermoplastic spraying assembly 80 rotates. Thus, the fitting which has a lower elbow shape extending from spraying assembly 80, is preferably screwed on tight to an elbow-like connector 221 at the end of tube 220 and then backed off half a turn. Since it is very thick thermoplastic which is running through fitting 230, such plastic would not likely leak at this point.

Also shown in FIG. 12 is an air cylinder 100 resting on cylinder plate 102 of thermoplastic spraying assembly 80. Air cylinder 100 operates under direction from electrical controls and under approximately 50 psi of pressure to raise up and lower dies to be discussed herein. For example, shown in FIG. 12 is a representative connection of cylinder 100 to bar 124 and bar 124 to rod 136 to raise and lower a die.

Figure 32:
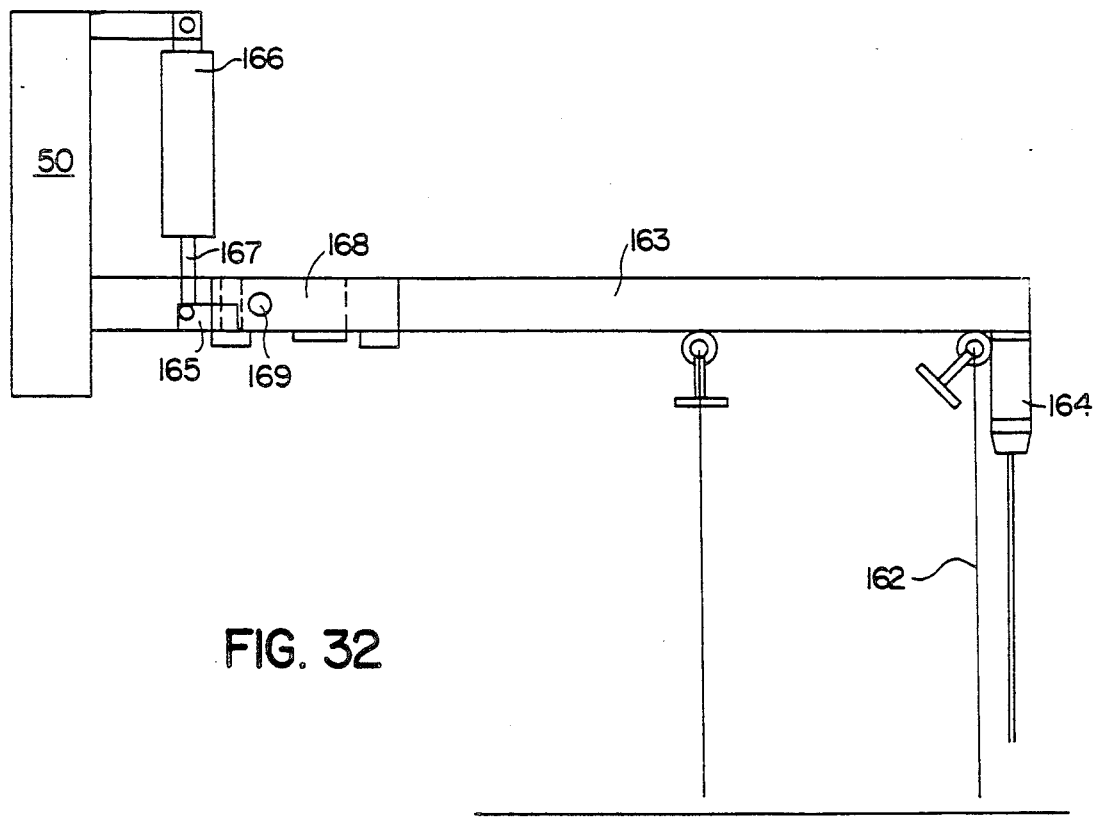
FIG. 32 is a side view of a preferred guide arm in accordance with the present invention.
Figure 33:
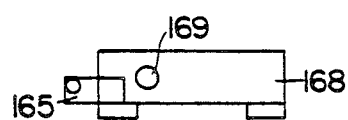
FIG. 33 is a side view of a pivoting element of the guide arm of FIG. 32.
Figure 34:
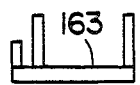
FIG. 34 is a front view of a guide extension of FIG. 32.

FIGS. 13-32 disclose elements of the preferred assembly for spraying a thermoplastic stripe on a road. FIGS. 13 and 14 illustrate views of the primary assembly elements. Specifically, FIG. 13 shows a bottom view of thermoplastic spraying assembly 80 and thermoplastic receiving fitting 230 and FIG. 14 shows a front view of primary elements of the same assembly and fitting. FIGS. 15-30 illustrate elements connected to or disposed in airless ribbon gun or assembly 80. FIGS. 31 and 32 disclose elements which can be added to the assembly 80 for certain applications.

Figure 25:
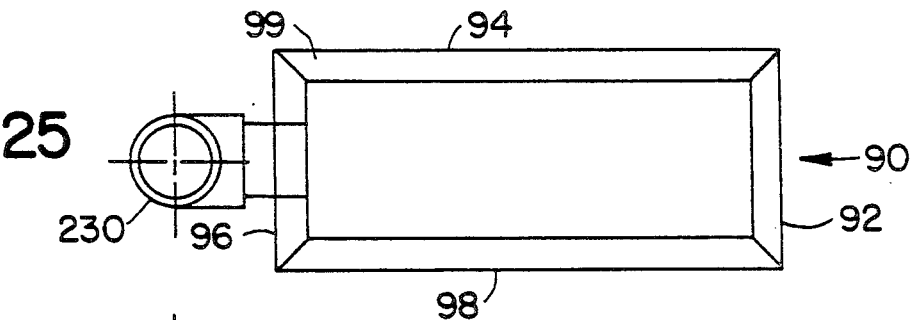
FIG. 25 is a plan view of the housing and receiving element of FIG. 24.
Figure 24:
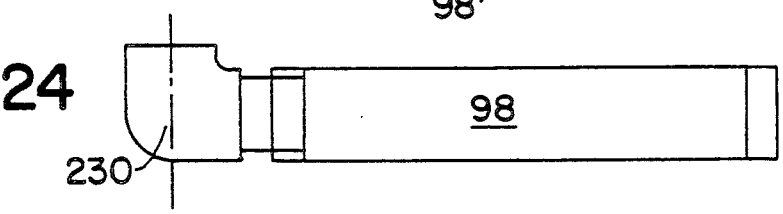
FIG. 24 is a rear view of a housing of the thermoplastic spraying assembly and thermoplastic receiving element of FIG. 13.

Housing 90, which is also shown in FIGS. 24 and 25, is preferably rectangular in shape. This housing is also preferably encapsulated on sides 92, 94, 96 and 98 by a casing defining a gap 99 for allowing heated oil to circulate therethrough. As seen in FIGS. 2 and 6, this heated oil is supplied to the housing from encapsulated tube 220 by feeder tube 450. When this heated oil is circulating adjacent the sides of the housing, heated thermoplastic can be continuously held at 390° F. or greater in the housing when the temperature of the environment is greater than 50° F.

As seen in FIGS. 8, 13, 18, 20, 22 and 26, the thermoplastic spraying assembly housing includes a bottom plate 81 having first 82, second 84 and third 86 tapered outlets adjacent the bottom of the housing. The first or frontmost of the outlets 82 in bottom plate 81 of the housing extends across substantially the entire length of the bottom of the housing. A second of the outlets 84 is located rearward of the first outlet.

Figure 28:
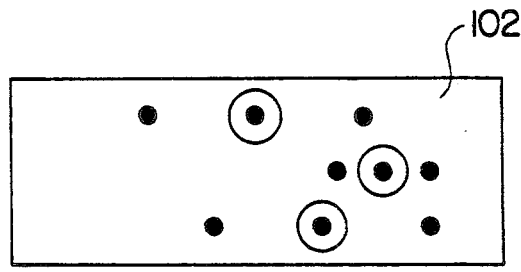
FIG. 28 is a plan view of a cylinder plate of the assembly of FIGS. 13 and 14.
Figure 27:
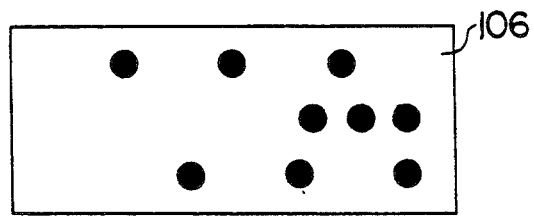
FIG. 27 is a plan view of a top plate of the assembly of FIGS. 13 and 14.
Figure 26:
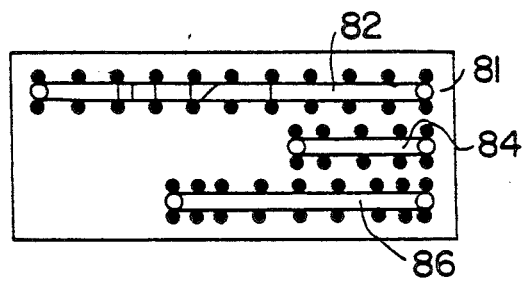
FIG. 26 is a plan view of a bottom plate of the assembly of FIGS. 13 and 14.

Above the housing are a plurality of plates 104 shown in FIG. 23 which extend upward above top plate 106 of FIGS. 14 and 27 to support cylinder plate 102 shown in FIGS. 12, 14 and 28. Holes are aligned in the plates of FIGS. 26, 27 and 28 so that a pin or the like can extend completely through the assembly to ensure alignment of these three plates 81, 102 and 106.

Shown in FIGS. 17, 19 and 21 are die and rod assemblies 110, 120 and 130 of various width. These three die assemblies have tapered bottoms or dies 112, 122 and 132 disposed in the assembly to close the respective tapered outlets of FIGS. 13, 18, 20 and 22 when required. One die, rod and outlets is often referred to as a die set.

Specifically, these dies are connected to air cylinder 100 through rods 116, 126 and 136 and bars 114 and 124 of FIGS. 12, 15 and 16. Bars 124 of FIG. 15 are used to move dies 120 and 130. Tapered dies are raised or lowered in response to the air cylinder. Consequently, selective tapered outlets 82, 84 and 86 are closed by the tapered dies 112, 122 and 132 so that heated thermoplastic in the assembly housing only sprays out through open tapered outlets.

Since the outlets are tapered, the spray will have a parabolic flow. So long as the tapered oulets are no more than two inches above the road, however, the parabolic flow will not effect the quality of the line.

The traffic stripe applying system includes circuitry for controlling the stripe width. Ribbon gun or thermoplastic spraying assembly outlets can, thus, be selectively opened and closed to apply, in the preferred case, 4 inch, 8 inch or 12 inch stripes to a road in response to the stripe width controlling circuitry without manual adjustment of the thermoplastic spraying apparatus. Consequently, an operator can go from 4 to 8 to 12 inch widths and back and forth just by turning a different switch.

Assembly 80 can optionally include a slider or sliders for manually sealing a substantial portion of an outlet. For example, when a slider is used, first 82 and second 84 outlets of the thermoplastic spraying apparatus housing can apply stripes to the road with a gap between the stripes each outlet produces. Seen in FIG. 31, is slider 400 of twelve inches or more (not to scale) which can be slide into housing 402 of FIGS. 29 and 30 for holding slider 400. This slider housing 402 of twelve inches or more (not to scale), if used, is bolted directly below outlet 82. Manual slider 400 has a 4" gap milled in it so that it seals approximately eight of the twelve inches of outlet 82. Thus, the circuitry for controlling the thermoplastic spraying assembly, the additional circuitry for controlling the reflective material spraying beads (which would work in conjunction with the adjustable line width circuitry), and the manual slider can be adjusted to form one 4 inch stripe, one 12 inch stripe, two adjacent solid 4 inch stripes, or one solid 4 inch stripe and one adjacent interrupted stripe without manually changing the outlets of the housing. It can also be appreciated from earlier discussions that these stripes can also be formed around a curve.

When forming two stripes with a gap therebetween, it is advantageous to have two separate outlets, for example 82 and 84, located close enough to minimize an irregular cut-off at the end of the stripe. In the preferred assembly, second four inch outlet 84, is approximately one inch rearward of the first outlet. A cut-off of less than two inches, however, would probably be acceptable.

As shown in FIG. 5 and as can be further appreciated from FIGS. 13-31, control elements such as those described in U.S. Pat. No. 3,477,352 to Harding can be advantageously used for controlling the thermoplastic spraying assembly so that one of the outlets of the thermoplastic spraying apparatus housing can be continuously opened for spraying a thermoplastic stripe while the other of the outlets can be intermittently open for spraying thermoplastic stripes for predetermined lengths and then intermittently closed to prevent spraying for predetermined gaps. The most advantageous structure for accomplishing this function in one assembly is to use the front two outlets 82 and 84 with a front outlet slider having a 4" gap. The timer can be used to make either outlet intermittent so that the skip line can be on either side of a dual line. Thus, on one pass this one versatile thermoplastic spraying assembly can apply one skipped and one adjacent solid line. This would be particularly advantageous in medium sized resurface applications, where in addition to the curved marking and legend requirements, center turn lanes would require that a solid and interrupted line be run.

It can be appreciated from FIGS. 13-31, that housing 90 can be modified to perform the equivalent functions for different widths or gaps between stripes. For example, if one required 6 inch gaps between two adjacent lines, the housing could be extended to include a 14 inch outlet and supporting die. In fact, the housing could probably be extended up to 16 inches to lay down generally standard 4 inch lines with an 8 inch gap between the lines if desired. Further, if the line requirements were for 3 inch or 2 inch widths, additional slider elements could be included to provide any width desired.

As discussed herein, the preferred reflective spraying system 170 with three glass bead guns 172, 174 and 176 in alignment with the thermoplastic stripe applying outlets would be electrically connected with the same disabling switches which would operate the ribbon gun or thermoplastic spraying assembly so that the beads and stripe applying assembly would work together. Specifically, in a preferred circuitry, 12 volts is continuously applied to a solenoid and operation of a switch on control box 150 actually completes the ground to operate the air cylinder and, thus, the dies. The reason these non-directional solenoids are interrupted by the ground signal is to minimize a spark which could create a radio signal that a line measurement timer might erroneously pick up. There is no limit, however, on the circuitry which can be applied to perform the desired functions described herein.

The preferred guide arm 160 shown in FIGS. 1-4, 6 and 32-34 can be raised either automatically or by hand. As discussed, this guide arm projects forward of vehicle 50 and includes at least one sighting pin 162 extending downward from the guide arm so that the operator knows the position of the outer side of the thermoplastic spraying outlets or any traffic stripe applying system when the vehicle is moving straight. Also included on guide arm 160 is a limit switch or curb feeler 164 extending downward from the guide arm, for sensing contact with a surface (for example, a curb) which is materially higher than the road surface. In addition, included is a cylinder 166, responsive to this limit switch, for commanding the partial raising of a forward portion of a guide arm up to 45° relative to the vehicle by downward action of rod 167 on the bottom of the cylinder. As seen in FIG. 32, rod 167 would push down on an inside of a projection 165 on guide bar 168 of FIG. 33 to partially rotate the projection about pivot point 169 of guide bar 168. This rotation can raise guide bar 168 and its adjacent extension 163 up to 45°. Although 45° should be high enough to avoid damage to the guide arm elements from the structures causing the arm to raise, one can also manually complete the raising of arm 160° to 90° relative to the vehicle. In addition, one can raise the guide boom completely by manual means about the same pivot point 169.

Figure 35:
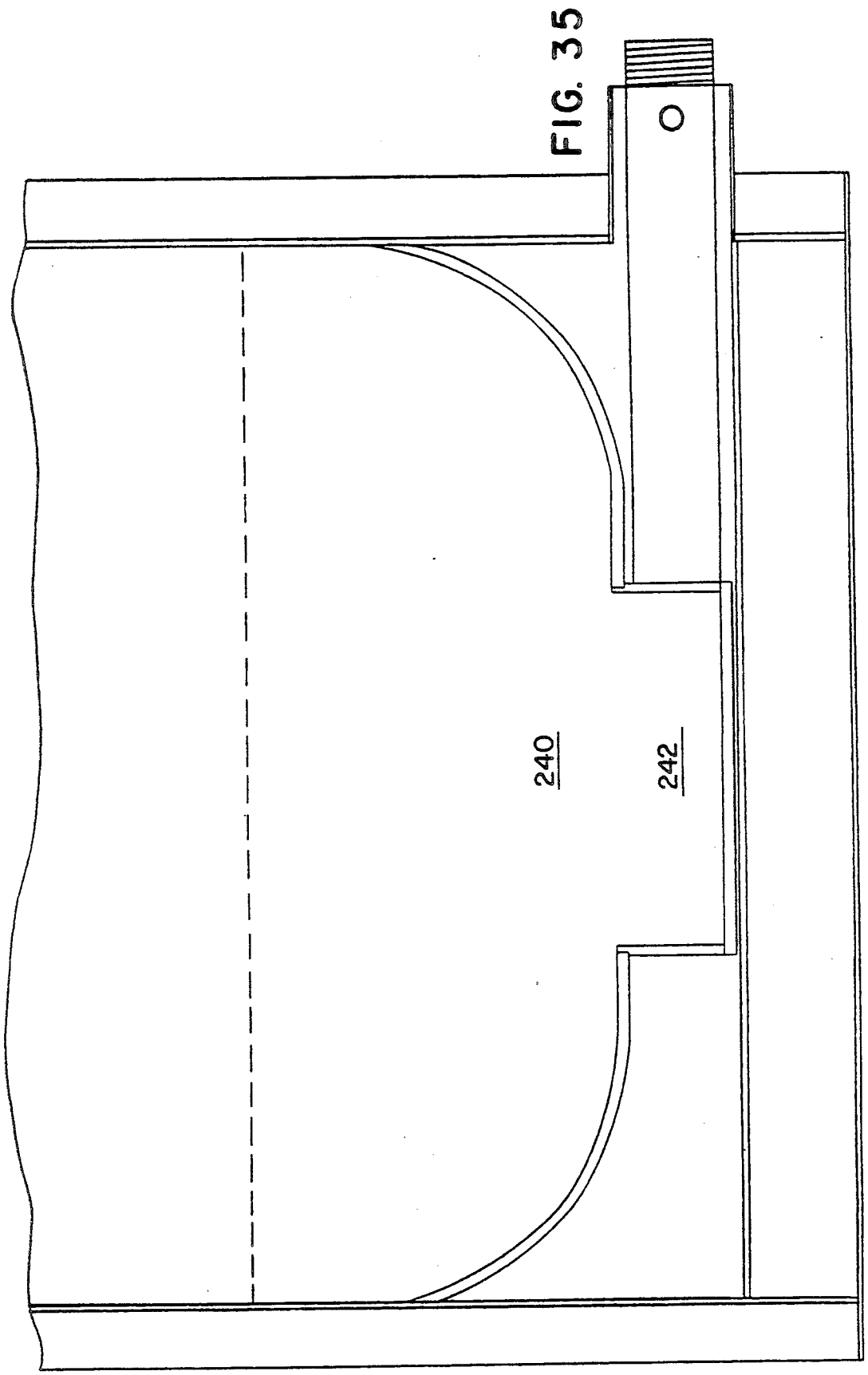
FIG. 35 is a portion of a thermoplastic holding tank having an area for positioning of a pump.

Shown in FIG. 35 is tank 240 for holding thermoplastic material on the vehicle. Also shown is an opening 242 where an excess volume pump is preferably located. The pump, in fluid communication with holding tank 240, pumps heated thermoplastic toward thermoplastic applying assembly 80. This pump preferably includes a shaft with a swash plate. A change in deflection of the swash plate will change the speed of the pump. Once, however, the angle of the swash plate is held constant, the relative pressure of the pump on the heated thermoplastic is an indication of the relative output of thermoplastic from thermoplastic spraying assembly 80. In other words, when the speed of the pump is held constant, the pressure of the pump is proportional to the rate of application of the heated thermoplastic from ribbon gun or thermoplastic spraying assembly 80.

Figure 36:
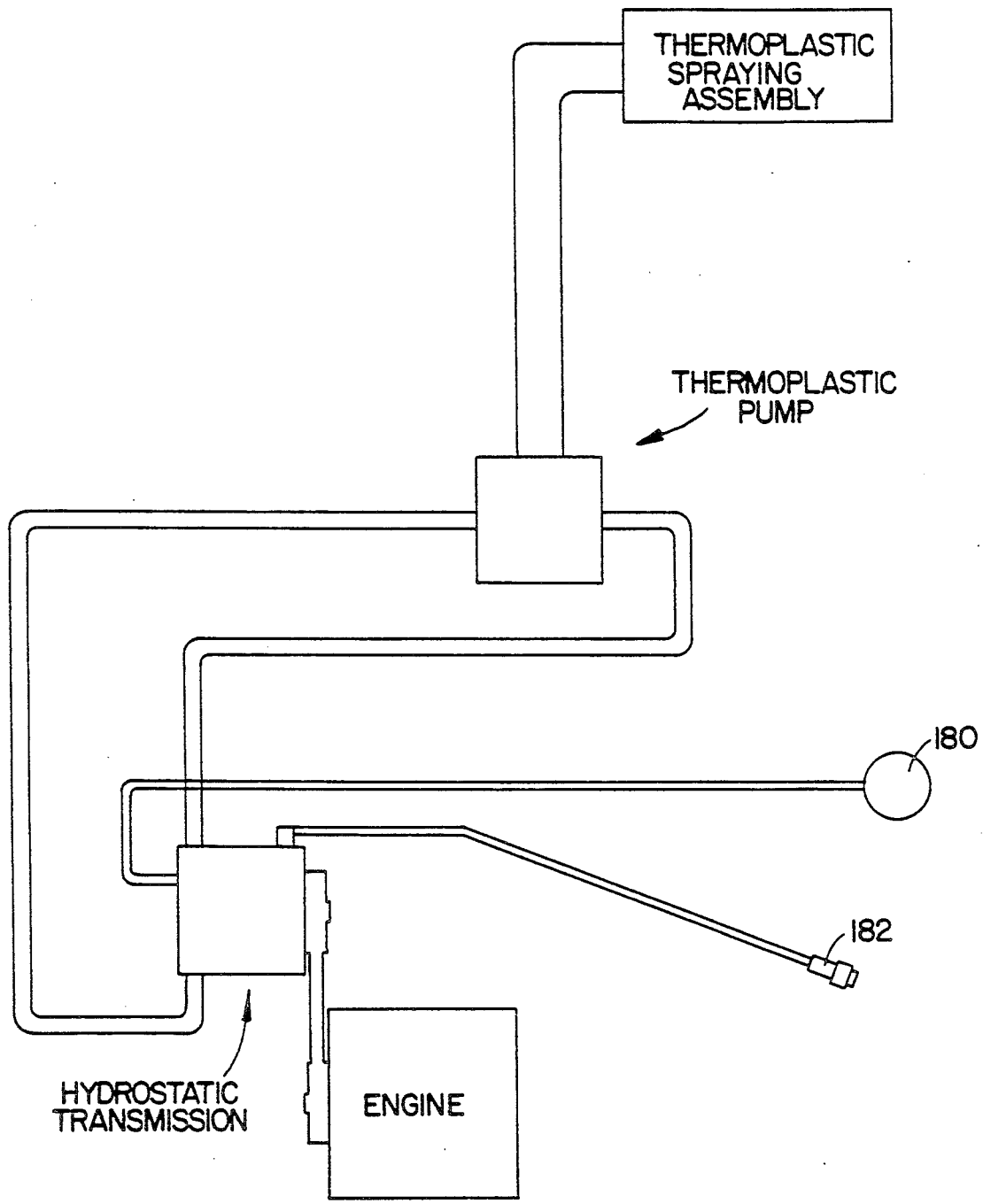
FIG. 36 is a preferred hydraulic circuit for driving the thermoplastic pump in accordance with the present invention.

Shown in FIG. 36 is a schematic of a hydrostatic transmission system for transmitting power to the pump by the pressure of incompressible fluids such as oil. Also connected to this hydrostatic transmisson, in a position where it can be controlled by the operator, is a vernier thottle linkage 182 for controlling the pressure of the fluid in the hydrostatic transmission system. In addition, connected to the hydrostatic transmission and shown in FIG. 1 is a gauge 180 for indicating the hydraulic pressure in the hydrostatic transmission system. Once the speed of the pump is held constant, the pressure of the hydrostatic transmission driving the pump is proportional to the pressure of the pump on the heated thermoplastic. Thus, the back pressure in the hydrostatic transmission system can give one an indication of the relative output of the thermoplastic from the thermoplastic spraying assembly.

This back pressure gauge 180, which, as seen in FIG. 1, is located conveniently for the operator to read it, can provide a relative indicator for the operator of the rate of application of the material. For example, when the indicator reads 900 psi, the pressure in the pump would be approximately 15 psi and the thermoplastic is being output at a certain rate. When the gauge is raised to 1,100 psi, the operator would know that the pressure in the thermoplastic spraying means has increased relatively to, for example, 20 psi, and that the rate of application of the material has increased. Although this relationship of a desired rate of thermoplastic application to back pressure would be derived empirically, once derived, this system would give the operator the ability to control the rate of application of material.

While the invention has been described in connection with what is presently considered to be the most practical and preferred embodiments, it is understood that the invention is not to be limited to the disclosed embodiments, but on the contrary it is intended to cover various modifications and equivalent arrangements included within the sphere and scope of the appended claims.

I claim:

1. An apparatus for applying a traffic stripe, comprising:
    a vehicle including a pair of front wheels and a pair of rear wheels;
    steering means, disposed on said vehicle, for steering said front wheels;
    applying means, disposed outward of said front wheels and adjacent to one of said front wheels, for applying a traffic stripe to a road;
    connecting means for pivotally connecting said applying means to said vehicle, said connecting means defining an axis about which said applying means pivots relative to the vehicle; and
    turning means, connected to said applying means, disposed forward of said pivot axis and acting in response to the steering of said front wheels, for turning said applying means in the same direction as said front wheels when said front wheels are turned.

2. An apparatus as in claim 1, wherein said traffic stripe applying means further comprises:
    means for spraying a thermoplastic stripe on a road; and
    means, disposed rearward of and in alignment with said thermoplastic stripe spraying means, for spraying reflective material over said thermoplastic stripe.

3. An apparatus as in claim 2, wherein:
    said thermoplastic spraying means further comprises a housing and an outlet in said housing through which thermoplastic is applied to a road; and
    said pivotally connecting means is disposed along a side of said housing which is nearest to said front wheels.

4. An apparatus as in claim 3, further comprising:
    means for delivering heated thermoplastic from said vehicle to said housing of said thermoplastic spraying means; and
    means, approximately aligned with the pivot axis of said connecting means and in fluid communication with said thermoplastic spraying means housing, for receiving said thermoplastic from said delivering means.

5. An apparatus as in claim 4, wherein said delivering means further comprises a substantially inflexible tube extending from said vehicle to said receiving means.

6. An apparatus as in claim 4, wherein said receiving means rotates relative to said tube as said stripe applying means rotates.

7. An apparatus as in claim 4, wherein said receiving means has an opening which is disposed upward, said opening has a center line extending substantially vertically through the opening and the center line is disposed parallel with and within two inches of the pivot axis of said connecting means.

8. An apparatus as in claim 2, further comprising:
    means, on said vehicle, for holding thermoplastic material;
    means, on said vehicle, for heating the thermoplastic material in said holding means to a temperature between 350° and 450° F.; and
    means, on said vehicle and in fluid communication with said holding means, for pumping the heated thermoplastic toward said thermoplastic spraying means.

9. An apparatus as in claim 8, further comprising:
    means for transmitting power to said pumping means by the pressure of imcompressible fluids;
    means, connected to said transmitting means, for controlling the pressure of said fluid in said transmitting means;
    means, connected to said transmitting means, for indicating the hydraulic pressure in said transmitting means; and
    wherein the pressure of said pumping means on said heated thermoplastic is proportional to said transmitting means pressure so that said indicator means indicates the relative pressure of said pumping means on the heated thermoplastic and indicates the relative output of thermoplastic from said thermoplastic spraying means when the speed of said transmitting means is kept constant.

10. An apparatus as in claim 1, wherein:
    said front wheels are connected along an axle defining a front wheel axis;
    said traffic stripe applying means further comprises a housing having an outlet throurgh which traffic striping material is applied to a road; and
    said outlet of said housing is disposed in front of a center line of said front wheel axis.

11. An apparatus as in claim 10, wherein said traffic stripe applying means applies a stripe within six inches of a curb on a road when a front of said vehicle is facing said curb.

12. An apparatus as in claim 10, further comprising means, disposed on said vehicle, for steering said rear wheels in a direction opposite to the direction the front wheels are steered.

13. An apparatus as in claim 12, wherein when said wheels are being turned by said front and rear wheel steering means, said rear wheels turn at a greater angle relative to a center line of a frame of said vehicle than do said front wheels.

14. An apparatus as in claim 1, further comprising a guide arm connected to said vehicle and projecting forward of said vehicle, including:
- a sighting pin extending downward from said guide arm;
- means for raising a forward portion of said guide arm; and
- means, extending downward from said guide arm, for sensing contact with a surface which is materially higher than the road surface; and
- means, responsive to said sensing means, for commanding the raising of a forward portion of said guide arm, at least partially, by said guide arm raising means.

15. An apparatus as in claim 1, further comprising means. disposed on said vehicle, for steering said rear wheels in a direction opposite to the direction the front wheels are steered.

16. An apparatus as in claim 15, wherein when said wheels are being turned by said front and rear wheel steering means, said rear wheels turn at a greater angle relative to a center line position of a frame of said vehicle than do said front wheels.

17. An apparatus as in claim 16, wherein approximately 60% of the steering of the vehicle is done by the rear wheels and approximately 40% of the steering of the vehicle is done by the front wheels.

18. An apparatus as in claim 1, further comprising:
- means for propelling said vehicle;
- means for supporting a driver, said driver supporting means disposed between said front and said rear wheels and on the same side of said vehicle as said traffic stripe applying means; and
- said steering means includes means, adjacent said driver supporting means, for manually controlling the direction of steering.

19. An apparatus as in claim 18, further comprising means, disposed on said vehicle, for holding up to four hundred pounds of thermoplastic material.

20. An apparatus as in claim 18, wherein said driver supporting means is primarily disposed outward of an area defined by said front and rear wheels.

21. An apparatus as in claim 18, wherein said propelling means propels said vehicle up to six miles per hour.

22. An apparatus for applying a traffic stripe to a road comprising:
- a vehicle including a pair of front wheels and a pair of rear wheels;
- steering means, disposed on said vehicle, for steering said front wheels;
- applying means, disposed outward of said front wheels and adjacent one of said front wheels, for applying a traffic stripe to a road;
- connecting means for pivotally connecting said applying means to said vehicle, said means defining an axis about which said applying means pivots relative to the vehicle; and
- turning means, connected to said applying means, disposed forward of said pivot axis and acting in response to the steering of said front wheels, for turning said applying means in the same direction and at a greater angle than said front wheels when said front wheels are turned in a direction towards said applying means.

23. An apparatus as in claim 22, wherein said traffic stripe applying means turns at an angle relative to a center line position of a frame of said vehicle of up to 10° more than said front wheels when said front wheels are turned in a direction towards said applying means.

24. An apparatus as in claim 22, wherein said traffic stripe applying means has a turning radius less than two and one-half feet.

25. An apparatus as in claim 22, wherein said traffic stripe applying means further comprises:
- means for spraying a thermoplastic stripe on a road; and
- means, disposed rearward of and in alignment with said thermoplastic material stripe spraying means, for spraying reflective material over said thermoplastic stripe.

26. An apparatus as in claim 25, wherein:
- said thermoplastic spraying means further comprises a housing and an outlet in said housing through which thermoplastic is applied to a road; and
- said pivotally connecting means is disposed along a side of said housing which is nearest to said front wheels.

27. An apparatus as in claim 26, further comprising:
- means for delivering heated thermoplastic from said vehicle to said housing of said thermoplastic spraying means; and
- means, approximately aligned with the pivot axis of said pivotally connecting means and in fluid communication with said thermoplastic spraying means housing, for receiving said thermoplastic from said delivering means.

28. An apparatus as in claim 27, wherein said delivering means further comprises a substantially inflexible tube extending from said vehicle to said receiving means.

29. An apparatus as in claim 27, wherein said receiving means rotates relative to said tube as said stripe applying means rotates.

30. An apparatus as in claim 27, wherein said receiving means has an opening which is disposed upward, said opening has a center line extending substantially vertically through the opening, and the center line is disposed parallel with and within two inches of the pivot axis of said connecting means.

31. An apparatus as in claim 25, wherein said apparatus includes means for controlling the stripe width and said thermoplastic spraying means includes outlets which can be selectively opened and closed to apply 4", 8" or 12" width stripes to a road in response to said stripe width controlling means without manual adjustment of said thermoplastic spraying means.

32. An apparatus as in claim 22, wherein said turning means further comprises:
- a first linkage, having a first end rotatably connected to said applying means and disposed forward of the pivot axis and having a second end extending in a direction generally towards said vehicle;
- a second linkage, having one end which moves in response to steering of said front wheels and in the same direction as said front wheels, and having a second end disposed forward of said first end of said second linkage and further inward than said first end of said second linkage when said front wheels are substantially parallel to a center line of a frame of said vehicle, and said second end of second linkage is rotatably connected to said second end of said first linkage.

33. An apparatus as in claim 32, wherein said second end of said second linkage is disposed inward from the front wheel adjacent said applying means at an angle of approximately 20° relative to a center line of said frame of said vehicle when said front wheels are substantially parallel to the center line of said frame of said vehicle.

34. An apparatus as in claim 32, wherein said vehicle further comprises spindles on which said wheels are supported, said steering means further comprises rotatable steering arms connected to each of said front wheel spindles, and said second linkage rotates in response to rotation of the steering arm of the front wheel located adjacent said stripe applying means.

35. An apparatus as in claim 22, wherein:
said front wheels are connected along an axle defining a front wheel axis;
said traffic stripe applying means further comprises a housing having an outlet through which traffic striping material is applied to a road; and
said outlet of said housing is disposed substantially in front of a center line of said front wheel axis.

36. An apparatus as in claim 35, wherein said traffic stripe applying means applies a stripe within six inches of a curb on a road when a front of said vehicle is facing said curb.

37. An apparatus as in claim 35, further comprising means, disposed on said vehicle, for steering said rear wheels in a direction opposite to the direction the front wheels are steered.

38. An apparatus as in claim 37, wherein when said wheels are being turned by said front and rear wheel steering means, said rear wheels turn at a greater angle relative to a center line of a frame of said vehicle than do said front wheels.

39. An apparatus as in claim 22, further comprising a guide arm connected to said vehicle and projecting forward of said vehicle, including:
a sighting pin extending downward from said guide arm;
means for raising a forward portion of said guide arm; and
means, extending downward from said guide arm, for sensing contact with a surface which is materially higher than the road surface; and
means, responsive to said sensing means, for commanding the raising of a forward portion of said guide arm, at least partially, by said guide arm raising means.

40. An apparatus as in claim 22, further comprising means, disposed on said vehicle, for steering said rear wheels in a direction opposite to the direction the front wheels are steered.

41. An apparatus as in claim 40, wherein when said wheels are being turned by said front and rear wheel steering means, said rear wheels turn at a greater angle relative to a center line position of a frame of said vehicle than do said front wheels.

42. An apparatus as in claim 41, wherein approximately 60% of the steering of the vehicle is done by the rear wheels and approximately 40% of the steering of the vehicle is done by the front wheels.

43. An apparatus as in claim 22, further comprising:
means for propelling said vehicle;
means for supporting a driver, said driver supporting means disposed between said front and said rear wheels and on the same side of said vehicle as said traffic stripe applying means; and
said steering means includes means, adjacent said driver supporting means, for manually controlling the direction of steering.

44. An apparatus as in claim 43, further comprising means, disposed on said vehicle, for holding up to four hundred pounds of thermoplastic material.

45. An apparatus as in claim 43, wherein said driver supporting means is primarily disposed outward of an area defined by said front and rear wheels.

46. An apparatus as in claim 43, wherein said propelling means propels said vehicle up to six miles per hour.

47. An apparatus for applying both straight and curved traffic stripes to a road comprising:
a vehicle including a frame and front and rear axles attached to said frame;
wheel spindles attached to both ends of each of said axles with said spindles attached to said front axle being rotatably attached to said front axle;
four wheels with each wheel mounted on one of said wheel spindles;
means for steering said front wheels including:
a rotatable steering linkage disposed adjacent said front axle;
means, disposed adjacent said front axle and connected to said steering linkage, for rotating said steering linkage in response to a directional input;
a pair of steering arms, each arm connected to one of said front wheel spindles, for transferring steering motion to the front wheel spindles;
a tie rod connected to each steering arm; and
means for rotating at least one of said steering arms in response to rotation of the steering linkage;
means for applying a traffic stripe on a road, said means disposed outward from and adjacent one of said front wheels;
means for connecting said stripe applying means to said vehicle, including means, adjacent said applying means and defining a pivot axis, for rotatably pivoting said applying means about said vehicle;
a stripe applying means linkage including a first end disposed forward of said pivot axis and rotatably attached to said applying means and having a second end extending in a direction generally towards said vehicle; and
a stripe applying means rotation directing arm having a first end, connected to the front steering arm which is closest to said stripe applying means, which moves responsive to movement of the front wheel steering arm to which it is connected, and having a second end disposed inward from the front wheel steering arm to which it is connected and connected to the second end of said stripe applying means linkage.

48. An apparatus as in claim 47, wherein said traffic stripe applying means further comprises:
means for spraying a thermoplastic stripe on a road; and
means, disposed rearward of and in alignment with said thermoplastic stripe spraying means, for spraying reflective material over said thermoplastic stripe.

49. An apparatus as in claim 47, wherein said stripe applying means rotation directing arm is disposed at an angle of approximately 20° inward from the steering arm to which it is connected when the front wheels are substantially parallel to a center line of the frame of said vehicle.

50. An apparatus for applying a continuous reflective stripe and an adjacent interrupted reflective stripe to a road comprising:

a vehicle including at least three wheels and a frame;

means, connected to said vehicle, for applying reflective stripes to the road including:

means for spraying a plurality of thermoplastic stripes generally parallel to a center line of the frame of said vehicle when said wheels of said vehicle are aligned substantially parallel to the center line of the frame of said vehicle;

means, disposed rearward of and in alignment with said thermoplastic spraying means, for spraying reflective material over said plurality of thermoplastic stripes;

said thermoplastic spraying means further comprises a housing including first and second outlets;

means, connected to said housing, for controlling said thermoplastic spraying means so that one of said outlets of said thermoplastic spraying means housing can be continuously open for spraying a thermoplastic stripe on the road while the other of said outlets can be intermittingly opened for spraying thermoplastic stripes for predetermined lengths on the road and intermittingly closed to prevent spraying for predetermined gaps; and means, connected to said reflective material spraying means, for controlling said reflective material spraying means so that said reflective material is primarily sprayed only over the plurality of thermoplastic stripes.

51. An apparatus as in claim 50, wherein:

a first of said outlets extends across substantially the entire length of the bottom of said housing and a second of said outlets is located on the bottom of said housing and rearward of said first outlet; and said apparatus further comprises means for manually sealing a substantial portion of said first outlet which is in front of said second outlet and adjacent said first outlet so that when said first and second outlets of said thermoplastic spraying means housing apply stripes to the road there is gap between the stripes each outlet applies.

52. An apparatus as in claim 51, wherein said first outlet is approximately twelve inches wide and said second outlet is approximately four inches wide and said manual sealing means seals approximately eight inches of said first outlet.

53. An apparatus as in claim 52, wherein said means for controlling said thermoplastic spraying means, said means for controlling said reflective material spraying means and said manual sealing means can also be adjusted to form one 4" stripe, one 12" stripe, or two solid 4" stripes without changing said outlets or said housing.

54. An apparatus as in claim 50, wherein said second outlet is disposed less than two inches rearward of said first outlet.

55. An apparatus as in claim 50, wherein said housing includes a plurality of side walls and said walls are encapsulated by a casing defining a gap for allowing heated oil to circulate therethrough.

56. An apparatus as in claim 55, wherein:

said apparatus further comprises:

means for delivering heated thermoplastic from said vehicle to said housing; and means for circulating heated oil adjacent said plurality of side walls of said housing; and when said heated oil is circulating adjacent said plurality of side walls of said housing said heated thermoplastic can be continuously held at 390° F. or greater in said housing when the temperature of the environment is greater than 50° F.

57. An apparatus as in claim 50, wherein said housing is disposed outside of an area defined by said wheels of said vehicle.

58. An apparatus as in claim 57, wherein:

said apparatus further comprises a plurality of front wheels and means for steering the front wheels of said vehicle;

said housing is disposed adjacent one of said front wheels of said vehicle;

said housing is pivotally connected to said vehicle;

said housing turns in the same direction and at a greater angle than the front wheels as the front wheels are turned in the direction of said housing; and said means for controlling said thermoplastic spraying means and said means for controlling said reflective material spraying means control said outlets to form a plurality of adjacent curved stripes of substantially equal width.

59. An apparatus as in claim 50, wherein said first and second outlets have one side aligned relative to each other, and said aligned side is adjacent a side of said housing which is parallel to the wheels of said vehicle when the wheels are substantially parallel to a center line of the frame of said vehicle.

* * * * *